(12) United States Patent
Matsuura

(10) Patent No.: US 12,527,725 B2
(45) Date of Patent: Jan. 20, 2026

(54) SOLVENT-FREE DENTAL ADHESIVE COMPOSITION

(71) Applicant: KURARAY NORITAKE DENTAL INC., Kurashiki (JP)

(72) Inventor: Ryo Matsuura, Niigata (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 1106 days.

(21) Appl. No.: 17/436,277

(22) PCT Filed: Mar. 5, 2020

(86) PCT No.: PCT/JP2020/009284
§ 371 (c)(1),
(2) Date: Sep. 3, 2021

(87) PCT Pub. No.: WO2020/179852
PCT Pub. Date: Sep. 10, 2020

(65) Prior Publication Data
US 2022/0175621 A1    Jun. 9, 2022

(30) Foreign Application Priority Data

Mar. 5, 2019   (JP) .................. 2019-039245

(51) Int. Cl.
| A61K 6/62 | (2020.01) |
| A61K 6/30 | (2020.01) |
| A61K 6/60 | (2020.01) |
| A61K 6/891 | (2020.01) |

(52) U.S. Cl.
CPC ................. *A61K 6/62* (2020.01); *A61K 6/30* (2020.01); *A61K 6/60* (2020.01); *A61K 6/891* (2020.01)

(58) Field of Classification Search
CPC ... A61K 6/62; A61K 6/30; A61K 6/60; A61K 6/891
See application file for complete search history.

(56) References Cited

U.S. PATENT DOCUMENTS

| 5,607,985 A * | 3/1997 | Masuhara ................. C08F 2/50 522/182 |
| 6,355,704 B1 | 3/2002 | Nakatsuka et al. |
| 2010/0130682 A1 | 5/2010 | Hinamoto et al. |
| 2011/0124763 A1 | 5/2011 | Hinamoto et al. |

FOREIGN PATENT DOCUMENTS

| EP | 0 627 476 A1 | 12/1994 | |
| JP | 3-243602 A | 10/1991 | |
| JP | 9-3109 A | 1/1997 | |
| JP | 10-245525 A | 9/1998 | |
| JP | 2000-16911 A | 1/2000 | |
| JP | 2000-159621 A | 6/2000 | |
| JP | 2000-212015 A | 8/2000 | |
| JP | 2012-46456 A | 3/2012 | |
| JP | 2012-62280 A | 3/2012 | |
| JP | 2018104367 A * | 7/2018 | |
| KR | 10-2015-0028662 A | 3/2015 | |
| WO | WO 2008/087977 A1 | 7/2008 | |
| WO | WO 2010/008077 A1 | 1/2010 | |
| WO | WO-2010069758 A1 * | 6/2010 | ........... C07C 233/20 |
| WO | WO 2019/044815 A1 | 3/2019 | |

OTHER PUBLICATIONS

Machine translation of JP-2018104367-A—(machine translated on Jan. 16, 2025) (Year: 2018).*
Wang et al., Chem. Commun., 2018, 54, 920-923 (Year: 2018).*
CAS Registery No. 474263-76-8, entered to STN Nov. 22, 2002. (Year: 2002).*
International Search Report issued on Jun. 2, 2020 in PCT/JP2020/009284 filed on Mar. 5, 2020, 3 pages.
Wang, J. et al., "A highly efficient waterborne photoinitiator for visible-light-induced three-dimensional printing of hydrogels," Chem. Commun., vol. 54, 2018, pp. 920-923.
Ullrich, G. et al., "Photoinitiators With Functional Groups. IX. Hydrophilic Bisacylphosphine Oxides for Acidic Aqueous Formulations," Journal of Polymer Science: Part A: Polymer Chemistry, vol. 44, 2006, pp. 1686-1700.
Ikemura, K. et al., "Synthesis of a novel camphorquinone derivative having acylphosphine oxide group, characterization by UV-VIS spectroscopy and evaluation of photopolymerization performance," Dental Materials Journal, vol. 29, No. 2, 2010, pp. 122-131.
Moszner, N. et al., "Chemical aspects of self-etching enamel-dentin adhesives: A systematic review," Dental Materials, vol. 21, 2005, pp. 895-910.
Extended European Search Report issued on Oct. 10, 2022 in European Patent Application No. 20765496.3, 8 pages.

* cited by examiner

*Primary Examiner* — Clinton A Brooks
*Assistant Examiner* — Izabela Schmidt
(74) *Attorney, Agent, or Firm* — Oblon, McClelland, Maier & Neustadt, L.L.P.

(57) ABSTRACT

The present invention provides a solvent-free dental adhesive composition exhibiting high initial bond strength and high bond durability to a tooth structure and being substantially free of water and an organic solvent. The present invention relates to a solvent-free dental adhesive composition comprising: an acid group-containing polymerizable monomer (A); a hydrophobic polymerizable monomer (B) having no acid group; and a photopolymerization initiator (C), wherein the photopolymerization initiator (C) comprises at least one selected from the group consisting of a compound (C-1) having a particular structure and a compound (C-2) having a particular structure.

20 Claims, No Drawings

SOLVENT-FREE DENTAL ADHESIVE COMPOSITION

TECHNICAL FIELD

The present invention relates to a solvent-free dental adhesive composition used in the field of dentistry. More specifically, the present invention relates to a solvent-free dental adhesive composition which is substantially free of water and an organic solvent and curing of which is promoted at an adhesive interface by contact with a moisture-containing wet matter.

BACKGROUND ART

A restorative filling material such as a filling composite resin or a filling compomer or a crown restoration material such as a metal alloy, a porcelain, or a resin material is typically used for restoration of tooth structures (enamel, dentin, and cementum) damaged, for example, by dental caries. In general, however, restorative filling materials and crown restoration materials (both of these materials may collectively be referred to as "dental restorative material(s)" in the present specification) themselves have no adhesive property for tooth structures. This is why bonding between tooth structures and dental restorative materials conventionally employs various adhesive systems involving the use of adhesives. An example of conventionally-employed adhesive systems is an adhesive system of the so-called acid etching type (total etching type), the use of which consists of subjecting the surface of a tooth structure to an etching treatment with an acid etching agent such as an aqueous phosphoric acid solution, then applying a bonding material which is an adhesive to the tooth structure, and bonding a dental restorative material to the tooth structure.

Meanwhile, there are adhesive systems of the so-called self-etching type, which involve no use of any acid etching agent. A conventionally dominant adhesive system of this type is a two-step adhesive system, the use of which consists of applying a self-etching primer containing an acidic monomer, a hydrophilic monomer, and water to the surface of a tooth structure and then, without washing with water, applying a bonding material containing a crosslinkable monomer and a polymerization initiator to the tooth structure. Recently, a one-step adhesive system involving the use of a one-pack dental adhesive (one-pack bonding material) having functions of both a self-etching primer and a bonding material has been widely employed.

An acidic monomer, a hydrophilic monomer, a crosslinkable monomer, and the like are commonly contained as monomer components in a one-pack bonding material, and water or a hydrophilic volatile organic solvent is commonly used for a one-pack bonding material.

However, when a one-pack bonding material as described above is used to restore a cavity, water and an organic solvent contained in the bonding material needs to be removed by air-blowing before curing of the one-pack bonding material. This is because the presence of water or an organic solvent causes insufficient curing or delay in curing. Therefore, a demand for a solvent-free dental adhesive composition substantially free of water and an organic solvent has been increasing in order to omit a step, for example, of air-blowing for removing water and an organic solvent.

Recently, self-adhesive dental composite resins which are dental composite resins having adhesive property have been developed, and solvent-free dental adhesive compositions usable for restorative treatment with fewer steps and without the use of a bonding material have also begun to be used practically.

In both of the above-described adhesion systems, it is common to apply a bonding material to a portion to be restored and cause photocuring of the bonding material. In the case of a self-adhesive dental composite resin, it is common to pour a self-adhesive dental composite resin in a portion to be restored and cause photocuring of the self-adhesive dental composite resin. Therefore, a photopolymerization initiator is used in these adhesion systems to impart the photopolymerizability. Camphorquinone/tertiary amine, which are conventionally well-known photopolymerization initiators, are the most common as such a photopolymerization initiator. Acylphosphine oxide compounds are known as photopolymerization initiators having excellent photocurability and being less likely to cause a color change and coloring. In particular, 2,4,6-trimethylbenzoyldiphenylphosphine oxide is known to impart excellent adhesive property for tooth structures to a polymerizable composition and is widely used (see Non Patent Literature 1).

Patent Literatures 1 to 3, for example, also propose two-step and one-step adhesion systems which involve inclusion of an acylphosphine oxide compound. However, when the amount of such a conventional acylphosphine oxide compound serving as a photopolymerization initiator is increased with an aim to improve the curability at an adhesive interface for further improvement of adhesive property, the curability of the resulting composition itself is increased but improvement of adhesive property for tooth structures is limited. Moreover, such a conventional acylphosphine oxide compound has a low solubility in water and is thus insufficiently dissolved, dispersed, and diffused in a tooth structure which is a wet matter. A study later carried out by the present inventor has revealed room for improvement.

Patent Literature 4 describes a dental photopolymerizable composition containing, as main constituent elements, a (meth)acrylate monomer, water, and a water-soluble acylphosphine oxide compound serving as a photopolymerization initiator. However, water is an essential component of the composition according to Patent Literature 4, and thus employment of the composition according to Patent Literature 4 as a solvent-free dental adhesive composition substantially free of water and an organic solvent is difficult, which fact has been known since the disclosure thereof.

Patent Literatures 5 and 6 propose polymerizable compositions capable of imparting high adhesive property for tooth structures and containing a novel (bis)acylphosphine oxide compound capable of imparting stable adhesive property which varies little according to adhesion operations. However, it has been confirmed that employment of these polymerizable compositions as solvent-free dental adhesive compositions substantially free of water and an organic solvent has problems in that polymerization at an adhesive interface is not promoted sufficiently, that both the initial bond strength and the bond durability to dentin are low, and that while failure caused in an adhesion test is cohesive failure of dentin serving as an adherend in the case where the bond strength is sufficiently high, failure at the interface between each adhesive composition and dentin is dominant due to poor bond strength. A study later carried out by the present inventor has revealed room for improvement.

CITATION LIST

Patent Literature

Patent Literature 1: JP 2000-16911 A
Patent Literature 2: JP 2000-212015 A

Patent Literature 3: WO 2010/008077 A1
Patent Literature 4: JP 2000-159621 A
Patent Literature 5: JP 2012-46456 A
Patent Literature 6: JP 2012-62280 A Non Patent Literature Non Patent Literature 1: Dental Materials, 2005, volume 21, pp. 895 to 910

SUMMARY OF INVENTION

Technical Problem

It is therefore an object of the present invention to provide a solvent-free dental adhesive composition exhibiting high initial bond strength and high bond durability to a tooth structure and being substantially free of water and an organic solvent.

Solution to Problem

As a result of intensive studies, the present inventor have found that the above disadvantages can be solved by a solvent-free dental adhesive composition comprising a certain photopolymerization initiator, and have completed the present invention based on this finding.

That is, the present invention includes the following.

[1] A solvent-free dental adhesive composition comprising:
an acid group-containing polymerizable monomer (A);
a hydrophobic polymerizable monomer (B) having no acid group; and
a photopolymerization initiator (C), wherein
the photopolymerization initiator (C) comprises at least one selected from the group consisting of a compound (C-1) represented by the following general formula (1) and a compound (C-2) represented by the following general formula (2):

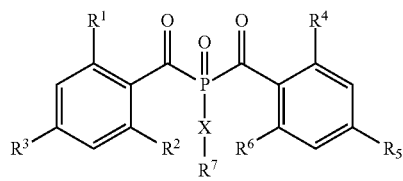

where $R^1$, $R^2$, $R^3$, $R^4$, $R^5$, and $R^6$ are each independently a linear or branched alkyl group having 1 to 4 carbon atoms or a halogen atom, X is a linear or branched alkylene group having 1 to 4 carbon atoms, and $R^7$ represents —CH(CH$_3$)COO(C$_2$H$_4$O)$_n$CH$_3$, where n represents an integer of 1 to 1000; and

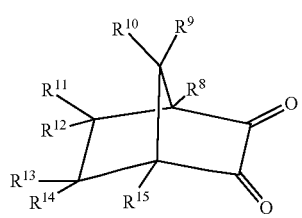

where $R^8$, $R^9$, $R^{10}$, $R^{11}$, $R^{12}$, $R^{13}$, $R^{14}$, and $R^{15}$ are each independently a hydrogen atom, a linear or branched alkyl group having 1 to 4 carbon atoms, a linear or branched alkoxy group having 1 to 4 carbon atoms, a halogen atom, —OH, or —COOY, and at least one of $R^8$ to $R^{15}$ is —COOY, where Y represents an organic cation or an inorganic cation.

[2] The solvent-free dental adhesive composition according to [1], wherein
the photopolymerization initiator (C) comprises the compound (C-2) represented by the general formula (2), and
the solvent-free dental adhesive composition further comprises a compound (F-1) represented by the following general formula (3) as a polymerization accelerator (F):

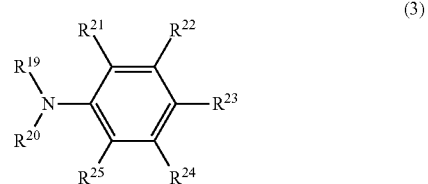

where $R^{19}$ and $R^{20}$ are each independently a linear or branched alkyl group having 1 to 4 carbon atoms, $R^{21}$, $R^{22}$, $R^{23}$, $R^{24}$, and $R^{25}$ are each independently a hydrogen atom, a linear or branched alkyl group having 1 to 4 carbon atoms, a linear or branched alkoxy group having 1 to 4 carbon atoms, a halogen atom, —OH, —COOH, or —COOY, and at least one of $R^{21}$ to $R^{25}$ is —COOH or —COOY, where Y represents an organic cation or an inorganic cation.

[3] The solvent-free dental adhesive composition according to [1] or [2], wherein the photopolymerization initiator (C) comprises the compound (C-1) represented by the general formula (1).

[4] The solvent-free dental adhesive composition according to any one of [1] to [3], wherein
one of the groups as $R^8$ to $R^{15}$ is —COOY and the other groups as $R^8$ to $R^{15}$ are each a hydrogen atom or a methyl group.

[5] The solvent-free dental adhesive composition according to any one of [2] to [4], wherein
$R^{19}$ and $R^{20}$ are each a methyl group or an ethyl group, one of the groups as $R^{21}$ to $R^{25}$ is —COOH or —COOY, and another one of the groups as $R^{21}$ to $R^{25}$ is —OH or a linear alkoxy group having 1 to 3 carbon atoms.

[6] The solvent-free dental adhesive composition according to any one of [1] to [5], wherein X is a methylene group.

[7] The solvent-free dental adhesive composition according to any one of [1] to [6], further comprising a hydrophilic polymerizable monomer (D) having no acid group.

[8] The solvent-free dental adhesive composition according to [7], wherein the content of the hydrophilic polymerizable monomer (D) having no acid group with respect to the total mass of the hydrophobic polymerizable monomer (B) having no acid group and the hydrophilic polymerizable monomer (D) having no acid group is 50 mass % or less.

[9] The solvent-free dental adhesive composition according to any one of [1] to[8], wherein the acid group-containing polymerizable monomer (A) is a phosphate group-containing polymerizable monomer.

[10] The solvent-free dental adhesive composition according to any one of [1] to [9], further comprising a photopolymerization initiator (E) having a structure other than the general formulae (1) and (2).

[11] The solvent-free dental adhesive composition according to [10], wherein the photopolymerization initiator (E) is at least one selected from the group consisting of (bis)acylphosphine oxides, α-diketones, and coumarins.

[12] The solvent-free dental adhesive composition according to [10] or [11], wherein a mass ratio between the photopolymerization initiator (C) and the photopolymerization initiator (E) is 10:1 to 1:10.

[13] A dental bonding material comprising the solvent-free dental adhesive composition according to any one of [1] to [12].

[14] A self-adhesive dental composite resin comprising the solvent-free dental adhesive composition according to any one of [1] to [12].

[15] A dental cement comprising the solvent-free dental adhesive composition according to any one of [1] to [12].

Advantageous Effects of Invention

The present invention provides: a solvent-free dental adhesive composition exhibiting high initial bond strength and high bond durability to a tooth structure and being substantially free of water and an organic solvent; and a dental bonding material, a self-adhesive dental composite resin, and a dental cement for which the composition is used.

DESCRIPTION OF EMBODIMENTS

A solvent-free dental adhesive composition of the present invention comprises: an acid group-containing polymerizable monomer (A); a hydrophobic polymerizable monomer (B) having no acid group; and a photopolymerization initiator (C), wherein the photopolymerization initiator (C) comprises, as an essential component, at least one selected from the group consisting of a compound (C-1) represented by a general formula (1) and a compound (C-2) represented by a general formula (2): The term "(meth)acrylate" as used in the present specification collectively refers to acrylate and methacrylate. The same applies to similar expressions. In the present specification, the upper limits and lower limits of value ranges (ranges of, for example, the contents of components, values calculated for components, and values of physical properties) can be combined appropriately.

Because the solvent-free dental adhesive composition of the present invention is free of a solvent, namely, water and an organic solvent, that causes insufficient curing or delay in curing, the solvent-free dental adhesive composition of the present invention has advantages in that a solvent removal step, for example, involving air-blowing can be omitted from curing of the solvent-free dental adhesive composition and in that the solvent-free dental adhesive composition can be applied to a self-adhesive dental composite resin that is a dental composite resin being free of water and an organic solvent and having adhesive property. It should be added that as long as no trouble such as insufficient curing or delay in curing is caused, a small amount (for example, 3 mass % or less with respect to the composition) of moisture or an organic solvent may be incorporated. Some commercially available components (for example, colloidal silica) to be contained contain water or an organic solvent. From such components are removed the water and the organic solvent so that the total amount thereof will be within the allowable limit. The components are thereafter used to prepare the solvent-free dental adhesive composition of the present invention.

It is not known exactly why the solvent-free dental adhesive composition of the present invention exhibits high initial bond strength and high bond durability to dentin, and the reason for this is probably as follows. This is attributable to the fact that the polymerization curability at a hydrophilic interface of a tooth surface is improved by comprising the photopolymerization initiator (C). A tooth structure, particularly dentin, contains moisture, and thus the interface is hydrophilic. In order to increase the bond strength to dentin, a resin-impregnated layer into which a polymerizable monomer of a dental adhesive composition penetrates needs to be formed at the hydrophilic tooth structure interface and the rate of polymerization needs to be increased to obtain a strong adhesive layer. A solvent-free dental adhesive composition, such as a conventional self-adhesive dental composite resin, which is free of a solvent has weak demineralization ability and weak penetration ability. A composition for which an ordinary photopolymerization initiator is used has an insufficient rate of polymerization and gives a weak resin-impregnated layer. Therefore, to compensate for the shortcoming and form a desirable resin-impregnated layer, the polymerization curability of the adhesive interface portion and that of the inside of the resin-impregnated layer particularly need to be increased. In contrast, since the photopolymerization initiator (C) is used for the solvent-free dental adhesive composition of the present invention, the concentration of the photopolymerization initiator (C) is high at a portion where the photopolymerization initiator (C) is in contact with the surface of a tooth structure and locally dissolved in water, and the polymerization curability of the adhesive interface portion and that of the inside of the resin-impregnated layer can be selectively increased. It is thought that the solvent-free dental adhesive composition of the present invention therefore has high bond strength.

The components used in the solvent-free dental adhesive composition of the present invention will be described hereinafter.

[Acid Group-Containing Polymerizable Monomer (A)]

The acid group-containing polymerizable monomer (A) is a component that has acid-etching effect and priming effect and imparts demineralization ability and penetration ability. The acid group-containing polymerizable monomer (A) is capable of polymerization and imparts curing ability. The inclusion of the acid group-containing polymerizable monomer (A) can contribute to enhancement of adhesive property for and bond durability to tooth structures.

An example of the acid group-containing polymerizable monomer (A) is a polymerizable monomer having at least one of acid groups such as a phosphoric acid group, a pyrophosphoric acid group, a thiophosphoric acid group, a phosphonic acid group, a sulfonic acid group, and a carboxylic acid group and having at least one of polymerizable groups such as an acryloyl group, a methacryloyl group, a vinyl group, and a styrene group. The acid group-containing polymerizable monomer (A) is preferably a phosphate group-containing polymerizable monomer in terms of adhesive property for tooth structures. Specific examples of the acid group-containing polymerizable monomer (A) are presented below.

Examples of the phosphoric acid group-containing polymerizable monomer include: 2-(meth)acryloyloxyethyl dihydrogen phosphate, 3-(meth)acryloyloxypropyl dihydrogen phosphate, 4-(meth)acryloyloxybutyl dihydrogen phosphate, 5-(meth)acryloyloxypentyl dihydrogen phosphate, 6-(meth)acryloyloxyhexyl dihydrogen phosphate, 7-(meth)acryloyloxyheptyl dihydrogen phosphate, 8-(meth)acryloyloxyoctyl dihydrogen phosphate, 9-(meth)acryloyloxynonyl dihydrogen phosphate, 10-(meth)acryloyloxydecyl dihydrogen phosphate, 11-(meth)acryloyloxyundecyl dihydrogen phosphate, 12-(meth)acryloyloxydodecyl dihydrogen phosphate, 16-(meth)acryloyloxyhexadecyl dihydrogen phosphate, 20-(meth)acryloyloxyicosyl dihydrogen phosphate, bis[2-(meth)acryloyloxyethyl] hydrogen phosphate, bis[4-(meth)acryloyloxybutyl] hydrogen phosphate, bis[6-(meth)acryloyloxyhexyl] hydrogen phosphate, bis[8-(meth)acryloyloxyoctyl] hydrogen phosphate, bis[9-(meth)acryloyloxynonyl] hydrogen phosphate, bis[10-(meth)acryloyloxydecyl] hydrogen phosphate, 1,3-di(meth)acryloyloxypropyl dihydrogen phosphate, 2-(meth)acryloyloxyethylphenyl hydrogen phosphate, 2-(meth)acryloyloxyethyl-2-bromoethyl hydrogen phosphate, and bis[2-(meth)acryloyloxy-(1-hydroxymethyl)ethyl] hydrogen phosphate; and their acid chlorides, alkali metal salts, and ammonium salts.

Examples of the pyrophosphoric acid group-containing polymerizable monomer include: bis[2-(meth)acryloyloxyethyl] pyrophosphate, bis[4-(meth)acryloyloxybutyl] pyrophosphate, bis[6-(meth)acryloyloxyhexyl] pyrophosphate, bis[8-(meth)acryloyloxyoctyl] pyrophosphate, and bis[10-(meth)acryloyloxydecyl] pyrophosphate; and their acid chlorides, alkali metal salts, and ammonium salts.

Examples of the thiophosphoric acid group-containing polymerizable monomer include: 2-(meth)acryloyloxyethyl dihydrogen thiophosphate, 3-(meth)acryloyloxypropyl dihydrogen thiophosphate, 4-(meth)acryloyloxybutyl dihydrogen thiophosphate, 5-(meth)acryloyloxypentyl dihydrogen thiophosphate, 6-(meth)acryloyloxyhexyl dihydrogen thiophosphate, 7-(meth)acryloyloxyheptyl dihydrogen thiophosphate, 8-(meth)acryloyloxyoctyl dihydrogen thiophosphate, 9-(meth)acryloyloxynonyl dihydrogen thiophosphate, 10-(meth)acryloyloxydecyl dihydrogen thiophosphate, 11-(meth)acryloyloxyundecyl dihydrogen thiophosphate, 12-(meth)acryloyloxydodecyl dihydrogen thiophosphate, 16-(meth)acryloyloxyhexadecyl dihydrogen thiophosphate, and 20-(meth)acryloyloxyicosyl dihydrogen thiophosphate; and their acid chlorides, alkali metal salts, and ammonium salts.

Examples of the phosphonic acid group-containing polymerizable monomer include: 2-(meth)acryloyloxyethylphenyl phosphonate, 5-(meth)acryloyloxypentyl-3-phosphonopropionate, 6-(meth)acryloyloxyhexyl-3-phosphonopropionate, 10-(meth)acryloyloxydecyl-3-phosphonopropionate, 6-(meth)acryloyloxyhexyl phosphonoacetate, and 10-(meth)acryloyloxydecyl phosphonoacetate; and their acid chlorides, alkali metal salts, and ammonium salts.

Examples of the sulfonic acid group-containing polymerizable monomer include 2-(meth)acrylamido-2-methylpropanesulfonic acid, styrenesulfonic acid, and 2-sulfoethyl (meth)acrylate.

Examples of the carboxylic acid group-containing polymerizable monomer include a polymerizable monomer having one carboxy group per molecule and a polymerizable monomer having two or more carboxy groups per molecule.

Examples of the polymerizable monomer having one carboxy group per molecule include (meth)acrylic acid, N-(meth)acryloylglycine, N-(meth)acryloylaspartic acid, O-(meth)acryloyltyrosine, N-(meth)acryloyltyrosine, N-(meth)acryloylphenylalanine, N-(meth)acryloyl-p-aminobenzoic acid, N-(meth)acryloyl-o-aminobenzoic acid, p-vinylbenzoic acid, 2-(meth)acryloyloxybenzoic acid, 3-(meth)acryloyloxybenzoic acid, 4-(meth)acryloyloxybenzoic acid, N-(meth)acryloyl-5-aminosalicylic acid, N-(meth)acryloyl-4-aminosalicylic acid, 2-(meth)acryloyloxyethyl hydrogen succinate, 2-(meth)acryloyloxyethyl hydrogen phthalate, 2-(meth)acryloyloxyethyl hydrogen malate, and their acid halides.

Examples of the polymerizable monomer having two or more carboxy groups per molecule include: 6-(meth)acryloyloxyhexane-1,1-dicarboxylic acid, 9-(meth)acryloyloxynonane-1,1-dicarboxylic acid, 10-(meth)acryloyloxydecane-1,1-dicarboxylic acid, 11-(meth)acryloyloxyundecane-1,1-dicarboxylic acid, 12-(meth)acryloyloxydodecane-1,1-dicarboxylic acid, 13-(meth)acryloyloxytridecane-1,1-dicarboxylic acid, 4-(meth)acryloyloxyethyl trimellitate, 4-(meth)acryloyloxyethyl trimellitate anhydride, 4-(meth)acryloyloxybutyl trimellitate, 4-(meth)acryloyloxyhexyl trimellitate, 4-(meth)acryloyloxydecyl trimellitate, and 2-(meth)acryloyloxyethyl-3'-(meth)acryloyloxy-2'-(3,4-dicarboxybenzoyloxy)propyl succinate; and their acid anhydrides and acid halides.

Among these acid group-containing polymerizable monomers, the phosphoric or pyrophosphoric acid group-containing polymerizable monomers are preferred since such monomers provide better adhesive property for tooth structures. Particularly preferred are the phosphoric acid group-containing (meth)acrylic polymerizable monomers. Among the phosphoric acid group-containing (meth)acrylic monomers, a divalent phosphoric acid group-containing (meth)acrylic polymerizable monomer that has as the main chain of the molecule an alkyl or alkylene group having 6 to 20 carbon atoms is more preferred, and a divalent phosphoric acid group-containing (meth)acrylic polymerizable monomer that has as the main chain of the molecule an alkylene group having 8 to 12 carbon atoms, such as 10-methacryloyloxydecyl dihydrogen phosphate, is most preferred, in terms of exhibiting high demineralization ability in the absence of an organic solvent and exhibiting high adhesive property.

One monomer may be used alone as the acid group-containing polymerizable monomer (A) or a combination of two or more monomers may be used as the acid group-containing polymerizable monomers (A). Having too high or low a content of the acid group-containing polymerizable monomer (A) may cause a decline in adhesive property. Thus, the content of the acid group-containing polymerizable monomer (A) is preferably in the range of 1 to 50 parts by mass, more preferably in the range of 3 to 40 parts by mass, and even more preferably in the range of 5 to 30 parts by mass, in 100 parts by mass of the total polymerizable monomer components in the solvent-free dental adhesive composition.

[Hydrophobic Polymerizable Monomer (B) Having No Acid Group]

As the hydrophobic polymerizable monomer (B) having no acid group, radical polymerizable monomers having no acid group and having a polymerizable group are preferred. The polymerizable group is preferably a (meth)acryl group and/or a (meth)acrylamide group in terms of ease of radical polymerization. The hydrophobic polymerizable monomer (B) having no acid group refers to a polymerizable monomer having no acid group and having a solubility of less than 10 weight % in water at 25° C. Examples of the hydrophobic polymerizable monomer (B) having no acid group include crosslinkable polymerizable monomers such as difunctional aromatic polymerizable monomers, difunctional aliphatic polymerizable monomers, and tri- or higher-functional polymerizable monomers. The hydrophobic polymerizable monomer (B) having no acid group improves, for example, handling properties of the solvent-free dental adhesive composition and mechanical strength of a cured product obtained by curing the composition.

Examples of the difunctional aromatic polymerizable monomer include 2,2-bis((meth)acryloyloxyphenyl)propane, 2,2-bis[4-(3-(meth)acryloyloxy-2-hydroxypropoxy)phenyl]propane, 2,2-bis(4-(meth)acryloyloxyethoxyphenynpropane, 2,2-bis(4-(meth)acryloyloxypolyethoxyphenyl)propane, 2,2-bis(4-(meth)acryloyloxydiethoxyphenyl)propane, 2,2-bis(4-(meth)acryloyloxytriethoxyphenyl)propane, 2,2-bis(4-(meth)acryloyloxytetraethoxyphenyl)propane, 2,2-bis(4-(meth)acryloyloxypentaethoxyphenyl)propane, 2,2-bis(4-(meth)acryloyloxydipropoxyphenyl)propane, 2-(4-(meth)acryloyloxydiethoxyphenyl)-2-(4-(meth)acryloyloxyethoxyphenyl)propane, 2-(4-(meth)acryloyloxydiethoxyphenyl)-2-(4-(meth)acryloyloxytriethoxyphenyl)propane, 2-(4-(meth)acryloyloxydipropoxyphenyl)-2-(4-(meth)acryloyloxytriethoxyphenyl)propane, 2,2-bis(4-(meth)acryloyloxypropoxyphenyl)propane, and 2,2-bis(4-(meth)acryloyloxyisopropoxyphenyl)propane. Preferred among these are 2,2-bis[4-(3-methacryloyloxy-2-hydroxypropoxy)phenyl]propane (commonly known as "Bis-GMA"), 2,2-bis(4-(meth)acryloyloxyethoxyphenyl)propane, 2,2-bis(4-methacryloyloxypolyethoxyphenyl)propane (having an average number of moles of added ethoxy groups of 2.6, commonly known as "D-2.6E"), 2,2-bis(4-(meth)acryloyloxydiethoxyphenyl)propane, 2,2-bis(4-(meth)acryloyloxytriethoxyphenyl)propane, 2,2-bis(4-(meth)acryloyloxytetraethoxyphenyl)propane, and 2,2-bis(4-(meth)acryloyloxypentaethoxyphenyl)propane.

Examples of the difunctional aliphatic polymerizable monomers include: glycerol di(meth)acrylate, ethylene glycol di(meth)acrylate, diethylene glycol di(meth)acrylate, triethylene glycol di(meth)acrylate, propylene glycol di(meth)acrylate, butylene glycol di(meth)acrylate, neopentyl glycol di(meth)acrylate, 1,3-butanediol di(meth)acrylate, 1,5-pentanediol di(meth)acrylate, 1,6-hexanediol di(meth)acrylate, 1,10-decanediol di(meth)acrylate, 1,2-bis(3-methacryloyloxy-2-hydroxypropoxy)ethane, 2,2,4-trimethylhexamethylenebis(2-carbamoyloxyethyl) di(meth)acrylate, N-methacryloyloxyethyl acrylamide, and N-methacryloyloxypropyl amide. Among these, triethylene glycol diacrylate, triethylene glycol dimethacrylate (commonly known as "3G"), neopentyl glycol di(meth)acrylate, 1,2-bis(3-methacryloyloxy-2-hydroxypropoxy)ethane, and 2,2,4-trimethylhexamethylenebis(2-carbamoyloxyethyl) dimethacrylate (commonly known as "UDMA") are preferred. To exhibit high initial bond strength and high bond durability to a tooth structure, 1,10-decanediol dimethacrylate (commonly known as "DD"), 2,2,4-trimethylhexamethylenebis(2-carbamoyloxyethyl) dimethacrylate, and N-methacryloyloxyethyl acrylamide (commonly known as "MAEA") are preferred.

Examples of the tri- or higher-functional polymerizable monomers include trimethylolpropane tri(meth)acrylate, trimethylolethane tri(meth)acrylate, trimethylolmethane tri(meth)acrylate, pentaerythritol tri(meth)acrylate, pentaerythritol tetra(meth)acrylate, dipentaerythritol penta(meth)acrylate, N,N-(2,2,4-trimethylhexamethylene)bis[2-(aminocarboxy)propane-1,3-diol]tetra(meth)acrylate, and 1,7-diacryloyloxy-2,2,6,6-tetra(meth)acryloyloxymethyl-4-oxaheptane. Among these, N,N-(2,2,4-trimethylhexamethylene)bis[2-(aminocarboxy)propane-1,3-diol]tetramethacrylate is preferred.

Among the above hydrophobic polymerizable monomers (B) having no acid group, the difunctional aromatic polymerizable monomers and the difunctional aliphatic polymerizable monomers are preferably used in terms of the mechanical strength and handling properties. Preferable examples of the difunctional aromatic polymerizable monomer are 2,2-bis[4-(3-(methacryloyloxy-2-hydroxypropoxy)phenyl]propane and 2,2-bis(4-methacryloyloxypolyethoxyphenyl)propane (having an average number of moles of added ethoxy groups of 2.6). Preferable examples of the difunctional aliphatic polymerizable monomers are glycerol di(meth)acrylate, triethylene glycol di(meth)acrylate, neopentyl glycol di(meth)acrylate, 1,6-hexanediol di(meth)acrylate, 1,10-decanediol di(meth)acrylate, 1,2-bis[3-methacryloxy-2-hydroxypropoxy]ethane, 2,2,4-trimethylhexamethylenebis(2-carbamoyloxyethyl) dimethacrylate, and N-methacryloyloxyethyl acrylamide.

Among the above hydrophobic polymerizable monomers (B) having no acid group, Bis-GMA, D-2.6E, 3G, UDMA, DD, and MAEA are more preferred and Bis-GMA, D-2.6E, UDMA, DD, and MAEA are even more preferred in terms of the initial bond strength, the bond durability, and the mechanical strength to a tooth structure in wet condition.

One of the hydrophobic polymerizable monomers (B) having no acid group may be contained alone, or a combination of two or more thereof may be contained. When the content of the hydrophobic polymerizable monomer (B) having no acid group is too high, the penetrability of the composition into tooth structures may decrease and thus its bond strength may decrease. When the content of the hydrophobic polymerizable monomer (B) having no acid group is too low, the improving effect on mechanical strength may not be obtained sufficiently. Thus, the content of the hydrophobic polymerizable monomer (B) having no acid group is preferably in the range of 40 to 99 parts by mass, more preferably in the range of 60 to 99 parts by mass, and even more preferably in the range of 80 to 99 parts by mass, in 100 parts by mass of the total polymerizable monomer components in the solvent-free dental adhesive composition.

[Hydrophilic Polymerizable Monomer (D) Having No Acid Group]

The solvent-free dental adhesive composition of the present invention preferably further comprises a hydrophilic polymerizable monomer (D) having no acid group. As the hydrophilic polymerizable monomer (D) having no acid group, radical polymerizable monomers having no acid group and having a polymerizable group are preferred. The polymerizable group is preferably a (meth)acryl group and/or a (meth)acrylamide group in terms of ease of radical polymerization. The hydrophilic polymerizable monomer (D) having no acid group refers to a polymerizable monomer having no acid group and having a solubility of 10 mass % or more in water at 25° C. The hydrophilic polymerizable monomer (D) having no acid group preferably has a solubility of 30 mass % or more in water at 25° C. and is more preferably freely soluble in water at 25° C. The hydrophilic polymerizable monomer (D) having no acid group promotes the penetration of the other components of the solvent-free dental adhesive composition into a tooth structure. The hydrophilic polymerizable monomer (D) having no acid group itself also penetrates into a tooth structure and adheres to an organic component (collagen) in the tooth structure. As the hydrophilic polymerizable monomer (D) having no acid group, those having a hydrophilic group such as a hydroxyl group, an oxymethylene group, an oxyethylene group, an oxypropylene group, or an amide group are preferred. Examples of the hydrophilic polymerizable monomer (D) having no acid group include: hydrophilic monofunctional (meth)acrylate polymerizable monomers such as 2-hydroxyethyl (meth)acrylate, 3-hydroxypropyl (meth)acrylate, 2-hydroxypropyl (meth)acrylate, 1,3-dihydroxypropyl (meth)acrylate, 2,3-dihydroxypropyl (meth)acrylate, 2-((meth)acryloyloxy) ethyl trimethylammonium chloride, and polyethylene glycol di(meth)acrylate (having 9 or more oxyethylene groups); and hydrophilic monofunctional (meth)acrylamide polymerizable monomers such as N-methylol (meth)acrylamide, N-hydroxyethyl (meth)acrylamide, N,N-bis(2-hydroxyethyl) (meth)acrylamide, N-methoxymethyl (meth)acrylamide, N-ethoxymethyl (meth)acrylamide, diacetone (meth)acrylamide, 4-(meth)acryloylmorpholine, N-trihydroxymethyl-N-methyl (meth)acrylamide, and a monofunctional (meth)acrylamide polymerizable monomer represented by the following general formula (4).

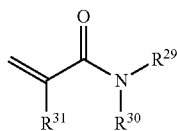

(4)

In the formula, $R^{29}$ and $R^{30}$ are each independently an optionally substituted, linear or branched alkyl group having 1 to 3 carbon atoms, and $R^{31}$ is a hydrogen atom or a methyl group.

Examples of the alkyl group having 1 to 3 carbon atoms as $R^{29}$ or $R^{30}$ include a methyl group, an ethyl group, an n-propyl group, and an isopropyl group.

Among these hydrophilic polymerizable monomers (D) having no acid group, in terms of adhesive property for tooth structures, 2-hydroxyethyl (meth)acrylate, 2,3-dihydroxypropyl (meth)acrylate, diacetone (meth)acrylamide, and hydrophilic monofunctional (meth)acrylamide polymerizable monomers are preferred, and 2-hydroxyethyl (meth)acrylate and a monofunctional (meth)acrylamide polymerizable monomer represented by the general formula (4) are more preferred. One of the hydrophilic polymerizable monomers (D) having no acid group may be contained alone, or a combination of two or more thereof may be contained.

Among the monofunctional (meth)acrylamide polymerizable monomers represented by the general formula (4), in terms of storage stability, N,N-dimethylacrylamide and N,N-diethylacrylamide are more preferred, and N,N-diethylacrylamide is even more preferred.

In the present invention, when the content of the hydrophilic polymerizable monomer (D) having no acid group is too low, the improving effect on bond strength may not be obtained sufficiently. When the content of the hydrophilic polymerizable monomer (D) having no acid group is too high, the mechanical strength may decrease. Thus, the content of the hydrophilic polymerizable monomer (D) having no acid group is preferably in the range of 0 to 50 parts by mass, more preferably in the range of 0 to 20 parts by mass, and even more preferably in the range of 0 to 10 parts by mass, in 100 parts by mass of the total polymerizable monomer components in the solvent-free dental adhesive composition. The content of the hydrophilic polymerizable monomer (D) having no acid group may be 0.

In the solvent-free dental adhesive composition of the present invention, the content of the hydrophilic polymerizable monomer (D) having no acid group in the total mass of the hydrophobic polymerizable monomer (B) having no acid group and the hydrophilic polymerizable monomer (D) having no acid group is preferably 50 mass % or less, more preferably 40 mass % or less, even more preferably 30 mass % or less, and particularly preferably 20 mass % or less in terms of exhibiting high initial bond strength and high bond durability also to a tooth structure in dry condition. The content of the hydrophilic polymerizable monomer (D) having no acid group may be 0.

[Photopolymerization Initiator (C)]

The solvent-free dental adhesive composition of the present invention comprises, as the photopolymerization initiator (C), at least one selected from the group consisting of the compound (C-1) represented by the general formula (1) and the compound (C-2) represented by the general formula (2). According to the present invention, a combination of the photopolymerization initiator (C) with the other components allows the solvent-free dental adhesive composition to achieve high initial bond strength and high bond durability.

First, the compound (C-1) represented by the general formula (1) will be described.

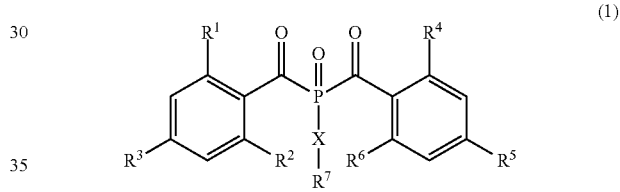

(1)

In this formula, $R^1$, $R^2$, $R^3$, $R^4$, $R^5$, and $R^6$ are each independently a linear or branched alkyl group having 1 to 4 carbon atoms or a halogen atom, X is a linear or branched alkylene group having 1 to 4 carbon atoms, and $R^7$ represents $-CH(CH_3)COO(C_2H_4O)_nCH_3$, where n represents an integer of 1 to 1000.

The alkyl group as $R^1$, $R^2$, $R^3$, $R^4$, $R^5$, or $R^6$ is not particularly limited as long as the alkyl group as $R^1$, $R^2$, $R^3$, $R^4$, $R^5$, or $R^6$ is a linear or branched alkyl group having 1 to 4 carbon atoms. Examples thereof include a methyl group, an ethyl group, an n-propyl group, an isopropyl group, an n-butyl group, an isobutyl group, a sec-butyl group, a 2-methylpropyl group, and a tert-butyl group. The alkyl group as $R^1$, $R^2$, $R^3$, $R^4$, $R^5$, or $R^6$ is preferably a linear alkyl group having 1 to 3 carbon atoms, more preferably a methyl group or an ethyl group, and even more preferably a methyl group. Examples of the alkylene group as X include a methylene group, an ethylene group, an n-propylene group, an isopropylene group, and an n-butylene group. The alkylene group as X is preferably a linear alkylene group having 1 to 3 carbon atoms, more preferably a methylene group or an ethylene group, and even more preferably a methylene group.

Among these, compounds in which $R^1$, $R^2$, $R^3$, $R^4$, $R^5$, and $R^6$ are each a methyl group are particularly preferred in terms of the storage stability and color stability in the composition. As to $R^7$, in terms of adhesive property, n is preferably 1 or greater, more preferably 2 or greater, and even more preferably 3 or greater, and particularly preferably 4 or greater, and is preferably 1000 or less, more preferably 100 or less, even more preferably 75 or less, and particularly preferably 50 or less. A preferred embodiment is a solvent-free dental adhesive composition in which the photopolymerization initiator (C) comprises the compound (C-1) represented by the general formula (1), where n in $R^7$ is 3 to 100.

The compound (C-1) having such a structure can be synthesized by a commonly-known method. For example, the compound (C-1) having such a structure can be synthesized by a method disclosed, for example, in a non-patent literature Chem. Commun., 2018, 54(8), pp. 920 to 923. The value of n depends on the molecular weight of polyethylene glycol methyl ether methacrylate as a raw material. Examples of the compound (C-1) include a compound synthesized from polyethylene glycol methyl ether methacrylate (n=9), a compound synthesized from polyethylene glycol methyl ether methacrylate (n=23), and a compound synthesized from polyethylene glycol methyl ether methacrylate with a molecular weight of 950.

Specific examples of the compound (C-1) are not particularly limited as long as the effect of the present invention can be obtained. Specific examples thereof include the following.

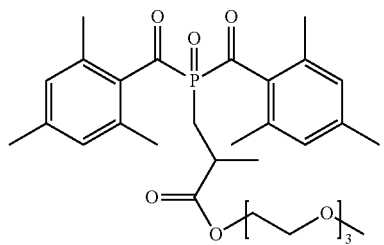

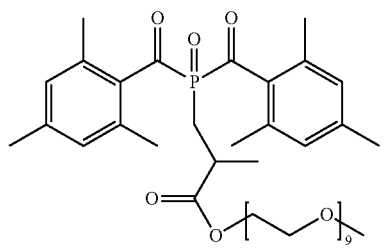

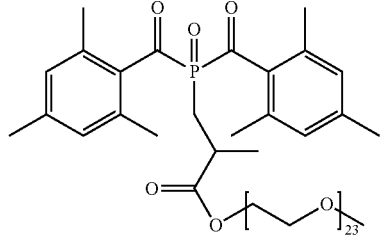

Next, the compound (C-2) represented by the general formula (2) will be described. In an embodiment where the compound (C-2) is used as the photopolymerization initiator (C), it is preferred in terms of exhibiting high initial bond strength and high bond durability to a tooth structure that the solvent-free dental adhesive composition of the present invention also comprises a later-described compound (F-1) represented by a general formula (3) as a polymerization accelerator (F).

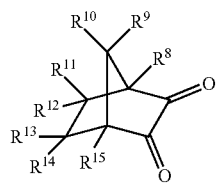

(2)

In the formula, $R^8$, $R^9$, $R^{10}$, $R^{11}$, $R^{12}$, $R^{13}$, $R^{14}$, and $R^{15}$ are each independently a hydrogen atom, a linear or branched alkyl group having 1 to 4 carbon atoms, a linear or branched alkoxy group having 1 to 4 carbon atoms, a halogen atom, —OH, or —COOY, and at least one of $R^8$ to $R^{15}$ is —COOY, where Y represents an organic cation or an inorganic cation.

The alkyl group as each of $R^8$ to $R^{15}$ is not particularly limited as long as it is a linear or branched alkyl group having 1 to 4 carbon atoms. Examples thereof include those previously mentioned as examples of the alkyl group as each of $R^1$ to $R^6$. The alkyl group as each of $R^8$ to $R^{15}$ is preferably a linear alkyl group having 1 to 3 carbon atoms, more preferably a methyl group or an ethyl group, and even more preferably a methyl group. The alkoxy group as each of $R^8$ to $R^{15}$ is not particularly limited as long as it is a linear or branched alkoxy group having 1 to 4 carbon atoms, and examples thereof include a methoxy group, an ethoxy group, an n-propoxy group, an isopropoxy group, an n-butoxy group, a sec-butoxy group, and a tert-butoxy group. The alkoxy group as each of $R^8$ to $R^{15}$ is preferably a linear alkoxy group having 1 to 3 carbon atoms, more preferably a methoxy group or an ethoxy group, and even more preferably a methoxy group.

Y is preferably alkali metal ion, alkaline-earth metal ion, magnesium ion, pyridinium ion having an optionally substituted pyridine ring, or ammonium ion represented by $HN^+R^{16}R^{17}R^{18}$ ($R^{16}$, $R^{17}$, and $R^{18}$ are each independently an organic group or a hydrogen atom).

Examples of the alkali metal ion include lithium ion, sodium ion, potassium ion, rubidium ion, and cesium ion. Examples of the alkaline-earth metal ion include calcium ion, strontium ion, barium ion, and radium ion. When Y is a pyridinium ion, examples of the substituent in the pyridine ring include halogen atoms (fluorine, chlorine, bromine, and iodine atoms), a carboxy group, linear or branched acyl groups having 2 to 6 carbon atoms, linear or branched alkyl groups having 1 to 6 carbon atoms, and linear or branched alkoxy groups having 1 to 6 carbon atoms. Examples of the ammonium ion represented by $HN^+R^{16}R^{17}R^{18}$ include ammonium ion derived from a variety of amines. Examples of the amines include ammonia, trimethylamine, diethylamine, dimethylaniline, ethylenediamine, triethanolamine, N,N-dimethylamino methacrylate, 4-(N,N-dimethylamino) benzoic acid and alkyl esters thereof, 4-(N,N-diethylamino) benzoic acid and alkyl esters thereof, and N,N-bis(2-hydroxyethyl)-p-toluidine. Examples of the organic group as $R^{16}$, $R^{17}$, or $R^{18}$ include those mentioned as examples of the substituent (exclusive of the halogen atoms) in the pyridine ring. Among these, Y is preferably lithium ion, sodium ion, potassium ion, calcium ion, magnesium ion, the ammonium ion represented by $HN^+R^{16}R^{17}R^{18}$, more preferably lithium ion, sodium ion, potassium ion, calcium ion, and magnesium ion, and even more preferably lithium ion and sodium ion. For example, when Y is a divalent ion (for example, calcium ion), "—COOY" represents —COOCa$_{1/2}$. In other words, when Y is a divalent ion, the compound (C-2) represented by the general formula (2) forms a dimer.

The compound (C-2) is preferably a compound in which one of the groups as $R^8$ to $R^{15}$ is —COOY, more preferably a compound in which one of the groups as $R^8$ to $R^{15}$ is —COOY and the other groups are a hydrogen atom or a methyl group, even more preferably a compound in which one of the groups as $R^8$ to $R^{15}$ is —COOY, the other groups as $R^8$ to $R^{15}$ is a hydrogen atom or a methyl group, and the number of methyl groups as the other groups as $R^8$ to $R^{15}$ is three or less, particularly preferably a compound in which $R^8$ is a hydrogen atom or a methyl group, $R^9$ is a methyl group or —COOY, $R^{10}$ is a methyl group, and (i) when $R^9$ is a methyl group, any one of $R^{11}$ to $R^{15}$ is —COOY and the other four are each a hydrogen atom or (ii) when $R^9$ is —COOY, $R^{11}$ to $R^{15}$ are each a hydrogen atom. Among these, a compound in which $R^8$ is a hydrogen atom or a methyl group, $R^9$ and $R^{10}$ are each a methyl group, $R^{11}$, $R^{12}$, $R^{13}$, and $R^{14}$ are each a hydrogen atom, and $R^{15}$ is COOY is most preferred in terms of adhesive property for tooth structures.

The compound (C-2) having any of these structures can be synthesized by a commonly-known method.

Specific examples of the compound (C-2) include, but are not particularly limited to, the following.

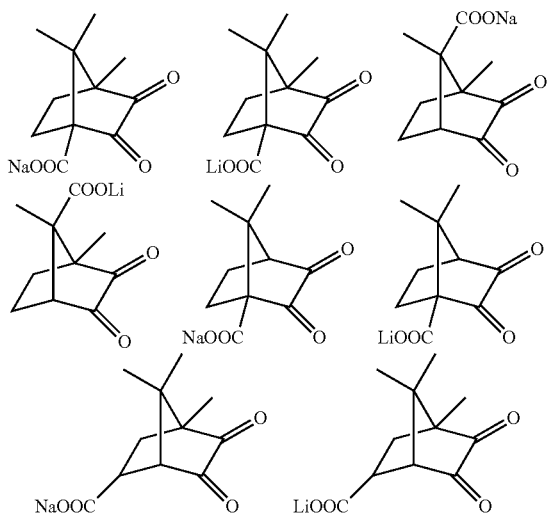

The photopolymerization initiator (C) may be dissolved in the solvent-free dental adhesive composition of the present invention or may be dispersed in the composition in the form of powder as long as the photopolymerization initiator (C) is soluble in water on the surface of a tooth structure and can selectively increase the polymerization curability of an adhesive interface portion and that of the inside of a resin-impregnated layer.

When the photopolymerization initiator (C) is dissolved in the form of powder, the photopolymerization initiator (C) having too large an average particle diameter tends to settle out. Therefore, the average particle diameter thereof is preferably 500 μm or less, more preferably 100 μm or less, and even more preferably 50 μm or less. On the other hand, too small an average particle diameter excessively increases the specific surface area of the powder, resulting in a decrease of the amount of the photopolymerization initiator (C) dispersible in the composition. Therefore, the average particle diameter thereof is preferably 0.01 μm or more. That is, the average particle diameter of the photopolymerization initiator (C) is preferably in the range of 0.01 to 500 μm, more preferably in the range of 0.01 to 100 μm, and even more preferably in the range of 0.01 to 50 μm.

The shape of the photopolymerization initiator (C) dispersed in the form of powder is not particularly limited. Examples thereof include various shapes such as spherical, needle, sheet, and crushed shapes. The photopolymerization initiator (C) can be produced by a conventionally known method, such as crushing, freeze-drying, or reprecipitation. The photopolymerization initiator (C) can be obtained, for example, by any of the following methods.

Method 1: Method for obtaining the photopolymerization initiator (C) by preparing an aqueous solution of the photopolymerization initiator (C), freezing the aqueous solution at −50° C., and then vacuum-drying the frozen aqueous solution Method 2: Method for obtaining the photopolymerization initiator (C) by preparing a saturated aqueous solution of the photopolymerization initiator (C), pouring the aqueous solution into ethanol at 0° C., and filtering the resulting crystals, which are washed with ethanol and then air-dried Method 3: Method for obtaining the photopolymerization initiator (C) by preparing a saturated aqueous solution of the photopolymerization initiator (C), rapidly cooling the aqueous solution to 0° C., and then filtering and air-drying the resulting crystals Method 4: Method for obtaining the photopolymerization initiator (C) by mechanical crushing and sieving The average particle diameter of the powder of the photopolymerization initiator (C) can be calculated as the volume average particle diameter after image analysis of an electron microscope photograph of 100 or more particles with the use of an image-analyzing particle size distribution analysis software (Mac-View manufactured by Mountech Co., Ltd.).

Among these methods for producing the photopolymerization initiator (C), freeze-drying (method 1) and reprecipitation (method 2) are preferred and freeze-drying (method 1) is more preferred, in terms of the average particle diameter of the resulting powder.

The content of the photopolymerization initiator (C) is preferably 0.01 to 20 parts by mass in terms of, for example, the curability of the resulting solvent-free dental adhesive composition, and is more preferably 0.05 to 10 parts by mass and even more preferably 0.1 to 5 parts by mass in terms of exhibiting high initial bond strength and high bond durability, with respect to 100 parts by mass of the total polymerizable monomer components in the solvent-free dental adhesive composition. If the content of the photopolymerization initiator (C) is less than 0.01 parts by mass, polymerization at the adhesive interface may not progress sufficiently and may cause a reduction in bond strength. The content of the photopolymerization initiator (C) is more suitably 0.05 parts by mass or more. On the other hand, if the content of the photopolymerization initiator (C) is more than 20 parts by mass and the polymerizability of the photopolymerization initiator (C) is low, not only sufficient bond strength may not be obtained but also dissolution, dispersion, and diffusion thereof in the solvent-free dental adhesive composition may be insufficient.

[Photopolymerization Initiator (E)]

In addition to the photopolymerization initiator (C), the solvent-free dental adhesive composition of the present invention may further comprise, in terms of the curability, a photopolymerization initiator (E) (hereinafter simply referred to as "photopolymerization initiator (E)") having a structure other than the general formulae (1) and (2). A commonly-known photopolymerization initiator can be used as the photopolymerization initiator (E) used in the present invention. One photopolymerization initiator (E) may be contained alone, or a combination of two or more thereof may be contained.

Examples of the photopolymerization initiator (E) include (bis)acylphosphine oxides, thioxanthones, ketals, α-diketones, coumarins, anthraquinones, benzoin alkyl ether compounds, and α-aminoketone compounds.

Examples of the (bis)acylphosphine oxides include acylphosphine oxides such as 2,4,6-trimethylbenzoyldiphenylphosphine oxide (TMDPO), 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di-(2,6-dimethylphenyl)phosphonate and salts thereof (sodium salts (for example, sodium salts of 2,4,6-trimethylbenzoylphenylphosphine oxide), lithium salts, ammonium salts, etc.). Other examples include bisacylphosphine oxides such as bis(2,6-dichlorobenzoyl)phenylphosphine oxide, bis(2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2,6-dimethoxybenzoyl)phenylphosphine oxide, bis(2,6-dimethoxybenzoyl)-2,4,4-trimethylpentylphosphine oxide, bis(2,6-dimethoxybenzoyl)-2,5-dimethylphenylphosphine oxide, bis(2,4,6-trimethylbenzoyl)phenylphosphine oxide, and bis(2,5,6-trimethylbenzoyl)-2,4,4-trimethylpentylphosphine oxide.

Examples of the thioxanthones include thioxanthone and 2-chlorothioxanthene-9-one.

Examples of the ketals include benzyl dimethyl ketal and benzyl diethyl ketal.

Examples of the α-diketones include diacetyl, benzyl, dl-camphorquinone, 2,3-pentadione, 2,3-octadione, 9,10-phenanthrenequinone, 4,4'-oxybenzyl, and acenaphthenequinone. Among these, dl-camphorquinone is particularly preferred in that it shows maximum absorption at a wavelength in the visible region.

Examples of the coumarins include compounds disclosed in JP H9-3109 A and JP H10-245525 A, such as 3,3'-carbonylbis(7-diethylaminocoumarin), 3-(4-methoxybenzoyl)coumarin, 3-thienoylcoumarin, 3-benzoyl-5,7-dimethoxycoumarin, 3-benzoyl-7-methoxycoumarin, 3-benzoyl-6-methoxycoumarin, 3-benzoyl-8-methoxycoumarin, 3-benzoylcoumarin, 7-methoxy-3-(p-nitrobenzoyl)coumarin, 3-(p-nitrobenzoyl)coumarin, 3,5-carbonylbis(7-methoxycoumarin), 3-benzoyl-6-bromocoumarin, 3,3'-carbonylbiscoumarin, 3-benzoyl-7-dimethylaminocoumarin, 3-benzoylbenzo[f]coumarin, 3-carboxycoumarin, 3-carboxy-7-methoxycoumarin, 3-ethoxycarbonyl-6-methoxycoumarin, 3-ethoxycarbonyl-8-methoxycoumarin, 3-acetylbenzo[f]coumarin, 3-benzoyl-6-nitrocoumarin, 3-benzoyl-7-diethylaminocoumarin, 7-dimethylamino-3-(4-methoxybenzoyl)coumarin, 7-diethylamino-3-(4-methoxybenzoyl)coumarin, 7-diethylamino-3-(4-diethylamino)coumarin, 7-methoxy-3-(4-methoxybenzoyl)coumarin, 3-(4-nitrobenzoyl)benzo[f]coumarin, 3-(4-ethoxycinnamoyl)-7-methoxycoumarin, 3-(4-dimethylaminocinnamoyl)coumarin, 3-(4-diphenylaminocinnamoyl)coumarin, 3-[(3-dimethylbenzothiazol-2-ylidene)acetyl]coumarin, 3-[(1-methylnaphto[1,2-d]thiazol-2-ylidene)acetyl]coumarin, 3,3'-carbonylbis(6-methoxycoumarin), 3,3'-carbonylbis(7-acetoxycoumarin), 3,3'-carbonylbis(7-dimethylaminocoumarin), 3-(2-benzothiazolyl)-7-(diethylamino)coumarin, 3-(2-benzothiazolyl)-7-(dibutylamino)coumarin, 3-(2-benzoimidazolyl)-7-(diethylamino)coumarin, 3-(2-benzothiazolyl)-7-(dioctylamino)coumarin, 3-acetyl-7-(dimethylamino)coumarin, 3,3'-carbonylbis(7-dibutylaminocoumarin), 3,3'-carbonyl-7-diethylaminocoumarin-7'-bis(butoxyethyl)aminocoumarin, 10-[3-[4-(dimethylamino)phenyl]-1-oxo-2-propenyl]-2,3,6,7-tetrahydro-1,1,7,7-tetramethyl-1H,5H,11H-[1]benzopyrano[6,7,8-ij]quinolizin-11-one, and 10-(2-benzothiazolyl-2,3,6,7-tetrahydro-1,1,7,7-tetramethyl-1H,5H, 11H-[1]benzopyrano[6,7,8-ij]quinolizin-11-one.

Among the above coumarins, 3,3'-carbonylbis(7-diethylaminocoumarin) and 3,3'-carbonylbis(7-dibutylaminocoumarin) are particularly suitable.

Examples of the anthraquinones include anthraquinone, 1-chloroanthraquinone, 2-chloro anthraquinone, 1-bromoanthraquinone, 1,2-benzanthraquinone, 1-methylanthraquinone, 2-ethylanthraquinone, and 1-hydroxyanthraquinone.

Examples of the benzoin alkyl ether compounds include benzoin methyl ether, benzoin ethyl ether, benzoin isopropyl ether, and benzoin isobutyl ether.

Examples of the α-aminoketone compounds include 2-methyl-1-[4-(methylthio)phenyl]-2-morpholinopropan-1-one.

Among these photopolymerization initiators (E), at least one selected from the group consisting of the (bis)acylphosphine oxides, the α-diketones, and the coumarins is preferably used. The use thereof contributes to obtaining the solvent-free dental adhesive composition excellent in photocurability under visible or near-ultraviolet light irradiation and exhibiting sufficient photocurability by light irradiation using any light source selected from a halogen lamp, a light-emitting diode (LED), and a xenon lamp.

The content of the photopolymerization initiator (E) is not particularly limited. In terms of, for example, the curability of the resulting composition, the content of the photopolymerization initiator (E) is preferably in the range of 0.01 to 10 mass %, more preferably in the range of 0.05 to 7 mass %, and even more preferably in the range of 0.1 to 5 mass %, with respect to 100 parts by mass of the total polymerizable monomer components in the solvent-free dental adhesive composition. If the content of the photopolymerization initiator (E) is more than 10 mass % and the polymerizability of the photopolymerization initiator itself is low, not only sufficient bond strength may not be obtained but also precipitation from the solvent-free dental adhesive composition may occur.

In the solvent-free dental adhesive composition of the present invention, a mass ratio between the photopolymerization initiator (C) and the photopolymerization initiator (E) is preferably 10:1 to 1:10, more preferably 7:1 to 1:7, and even more preferably 5:1 to 1:5 in terms of, for example, the curability of the resulting composition.

[Chemical Polymerization Initiator]

The solvent-free dental adhesive composition of the present invention can further comprise a chemical polymerization initiator, and organic peroxides are preferably used as the chemical polymerization initiator. The organic peroxides that may be used as the chemical polymerization initiator are not particularly limited, and commonly-known organic peroxides can be used. Typical examples of the organic peroxides include ketone peroxides, hydroperoxides, diacyl peroxides, dialkyl peroxides, peroxyketals, peroxyesters, and peroxydicarbonates. Specific examples of these organic peroxides include those disclosed in WO 2008/087977 A1.

[Polymerization Accelerator (F)]

In another embodiment, a polymerization accelerator (F) is used together with the photopolymerization initiator (E) and/or the chemical polymerization initiator. Examples of the polymerization accelerator (F) used in the present invention include amines, sulfinic acids and salts thereof, borate compounds, barbituric acid derivatives, triazine compounds, copper compounds, tin compounds, vanadium compounds, halogen compounds, aldehydes, thiol compounds, sulfites, hydrogen sulfites, and thiourea compounds. A preferred embodiment is a solvent-free dental adhesive composition in which the polymerization accelerator (F) is an amine Another preferred embodiment is a solvent-free dental adhesive composition in which the polymerization accelerator (F) is an aromatic amine. Another preferred embodiment is a solvent-free dental adhesive composition substantially free of a borate compound and/or a vanadium compound as the polymerization accelerator (F). Being substantially free of the polymerization accelerator (F) means that the content of the polymerization accelerator (F) is preferably less than 1 mass %, more preferably less than 0.1 mass %, and even more preferably less than 0.01 mass %.

The amines used as the polymerization accelerator (F) are classified into aliphatic amines and aromatic amines. Examples of the aliphatic amines include: primary aliphatic amines such as n-butylamine, n-hexylamine, and n-octylamine; secondary aliphatic amines such as diisopropylamine, dibutylamine, and N-methylethanolamine; and tertiary aliphatic amines such as N-methyldiethanolamine, N-ethyldiethanolamine, N-n-butyldiethanolamine, N-lauryldiethanolamine, 2-(dimethylamino)ethyl methacrylate, N-methyldiethanolamine dimethacrylate, N-ethyldiethanolamine dimethacrylate, triethanolamine monomethacrylate, triethanolamine dimethacrylate, triethanolamine trimethacrylate, triethanolamine, trimethylamine, triethylamine, and tributylamine. Among these, the tertiary aliphatic amines are preferred in terms of the curability and storage stability of the solvent-free dental adhesive composition and, in particular, N-methyldiethanolamine and triethanolamine are more preferably used.

Examples of the aromatic amines include N,N-bis(2-hydroxyethyl)-3,5-dimethylaniline, N,N-bis(2-hydroxyethyl)-p-toluidine, N,N-bis(2-hydroxyethyl)-3,4-dimethylaniline, N,N-bis(2-hydroxyethyl)-4-ethylaniline, N,N-bis(2-hydroxyethyl)-4-isopropylaniline, N,N-bis(2-hydroxyethyl)-4-t-butylaniline, N,N-bis(2-hydroxyethyl)-3,5-di-isopropylaniline, N,N-bis(2-hydroxyethyl)-3,5-di-t-butylaniline, N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-isopropylaniline, N,N-dimethyl-4-t-butylaniline, N,N-dimethyl-3,5-di-t-butylaniline, ethyl 4-(N,N-dimethylamino)benzoate, methyl 4-(N,N-dimethylamino)benzoate, propyl 4-(N,N-dimethylamino)benzoate, n-butoxyethyl 4-(N,N-dimethylamino)benzoate, 2-(methacryloyloxy)ethyl 4-(N,N-dimethylamino)benzoate, 4-(N,N-dimethylamino)benzophenone, butyl 4-(N,N-dimethylamino)benzoate, and a compound (F-1) represented by a general formula (3). Among these, at least one selected from the group consisting of N,N-bis(2-hydroxyethyl)-p-toluidine, ethyl 4-(N,N-dimethylamino)benzoate, n-butoxyethyl 4-(N,N-dimethylamino)benzoate, and 4-(N,N-dimethylamino)benzophenone is preferably used in terms of the ability to impart excellent curability to the solvent-free dental adhesive composition.

When the solvent-free dental adhesive composition of the present invention comprises the photopolymerization initiator (C-2) as the photopolymerization initiator (C), the compound (F-1) represented by the general formula (3) is preferably used as the polymerization accelerator (F) in terms of exhibiting high initial bond strength and high bond durability to a tooth structure.

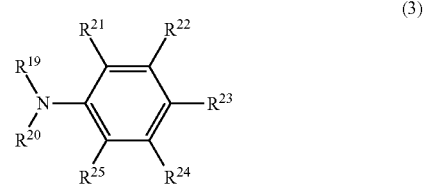

(3)

In the formula, $R^{19}$ and $R^{20}$ are each independently a linear or branched alkyl group having 1 to 4 carbon atoms, $R^{21}$, $R^{22}$, $R^{23}$, $R^{24}$, and $R^{25}$ are each independently hydrogen, a linear or branched alkyl group having 1 to 4 carbon atoms, a linear or branched alkoxy group having 1 to 4 carbon atoms, a halogen atom, —OH, —COOH, or —COOY, and at least one of $R^{21}$ to $R^{25}$ is —COOH or —COOY, where Y represents an organic cation or an inorganic cation.

The alkyl group as each of $R^{19}$ to $R^{25}$ is not particularly limited as long as it is a linear or branched alkyl group having 1 to 4 carbon atoms. Examples thereof include a methyl group, an ethyl group, an n-propyl group, an isopropyl group, an n-butyl group, an isobutyl group, a sec-butyl group, a 2-methylpropyl group, and a tert-butyl group. The alkyl group is preferably a linear alkyl group having 1 to 3 carbon atoms, more preferably a methyl group or an ethyl group, and even more preferably a methyl group. The alkoxy group as each of $R^{21}$ to $R^{25}$ is not particularly limited as long as it is a linear or branched alkoxy group having 1 to 4 carbon atoms, and examples thereof include a methoxy group, an ethoxy group, an n-propoxy group, an isopropoxy group, an n-butoxy group, a sec-butoxy group, and a tert-butoxy group. The alkoxy group as each of $R^{21}$ to $R^{25}$ is preferably a linear alkoxy group having 1 to 3 carbon atoms, more preferably a methoxy group or an ethoxy group, and even more preferably a methoxy group.

Y is preferably alkali metal ion, alkaline-earth metal ion, magnesium ion, pyridinium ion having an optionally substituted pyridine ring, or ammonium ion represented by $HN^+R^{26}R^{27}R^{28}$ ($R^{26}$, $R^{27}$, and $R^{28}$ are each independently an organic group or a hydrogen atom).

Examples of the alkali metal ion include lithium ion, sodium ion, potassium ion, rubidium ion, and cesium ion. Examples of the alkaline-earth metal ion include calcium ion, strontium ion, barium ion, and radium ion. When Y is a pyridinium ion, examples of the substituent in the pyridine ring include halogen atoms (fluorine, chlorine, bromine, and iodine atoms), a carboxy group, linear or branched acyl groups having 2 to 6 carbon atoms, linear or branched alkyl groups having 1 to 6 carbon atoms, and linear or branched alkoxy groups having 1 to 6 carbon atoms. Examples of the ammonium ion represented by $HN^+R^{26}R^{27}R^{28}$ include ammonium ion derived from a variety of amines. Examples of the amines include ammonia, trimethylamine, diethylamine, dimethylaniline, ethylenediamine, triethanolamine, N,N-dimethylamino methacrylate, 4-(N,N-dimethylamino) benzoic acid and alkyl esters thereof, 4-(N,N-diethylamino) benzoic acid and alkyl esters thereof, and N,N-bis(2-hydroxyethyl)-p-toluidine. Examples of the organic group as $R^{26}$, $R^{27}$, or $R^{28}$ include those mentioned as examples of the substituent (exclusive of the halogen atoms) in the pyridine ring. Among these, Y is preferably lithium ion, sodium ion, potassium ion, calcium ion, magnesium ion, the ammonium ion represented by $HN^+R^{26}R^{27}R^{28}$, more preferably lithium ion, sodium ion, potassium ion, calcium ion, and magnesium ion, and even more preferably lithium ion and sodium ion. For example, when Y is a divalent ion (for example, calcium ion), "—COOY" represents "—COOCa$_{1/2}$". In other words, when Y is a divalent ion, the compound (F-1) represented by the general formula (3) forms a dimer.

The compound (F-1) is preferably a compound in which $R^{19}$ and $R^{20}$ are each a methyl group or an ethyl group and one of the groups as $R^{21}$ to $R^{25}$ is —COOH or —COOY, more preferably a compound in which $R^{19}$ and $R^{20}$ are each a methyl group or an ethyl group, one of the groups as $R^{21}$ to $R^{25}$ is —COOH or —COOY, and another one of the groups as $R^{21}$ to $R^{25}$ is —OH or a linear alkoxy group having 1 to 3 carbon atoms, even more preferably a compound in which $R^{19}$ and $R^{20}$ are each a methyl group, either $R^{21}$ or $R^{22}$ is —COOH or —COOY, one of the groups as $R^{23}$ to $R^{25}$ is —OH or a methoxy group, particularly preferably a compound in which $R^{19}$ and $R^{20}$ are each a methyl group, either $R^{21}$ or $R^{22}$ is —COOH or —COOY, and (i) when $R^{21}$ is —COOH or —COOY, $R^{22}$, $R^{24}$, and $R^{25}$ are each a hydrogen atom and $R^{23}$ is —OH or a methoxy group or (ii) when $R^{22}$ is —COOH or —COOY, $R^{21}$, $R^{23}$, and $R^{25}$ are each a hydrogen atom and $R^{24}$ is —OH or a methoxy group. Among these, a compound in which $R^{19}$ and $R^{20}$ are each a methyl group, $R^{21}$ is —COOH or —COOY, $R^{22}$, $R^{24}$, and $R^{25}$ are each a hydrogen atom, and $R^{23}$ is a methoxy group is most preferred in terms of adhesive property for tooth structures.

Compounds having these structures can be synthesized by a commonly-known method, and some of the compounds having such structures are commercially available.

Specific examples of the polymerization accelerator (F-1) having any of these structures include, but are not particularly limited to, the following.

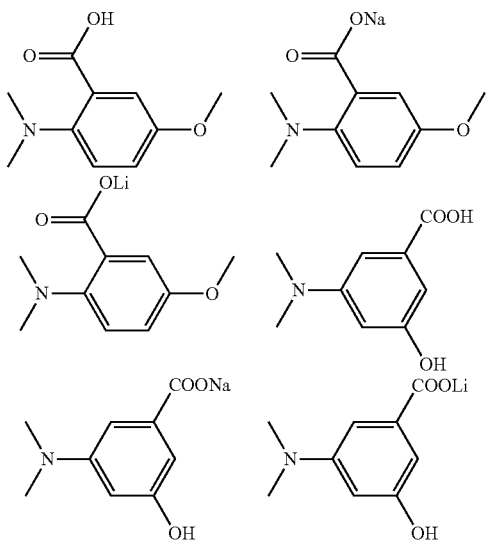

The polymerization accelerator (F-1) may be dissolved in the solvent-free dental adhesive composition of the present invention or may be dispersed in the composition in the form of powder as long as the polymerization accelerator (F-1) is soluble in water on the surface of a tooth structure and can selectively increase the polymerization curability of an adhesive interface portion and that of the inside of a resin-impregnated layer.

When the polymerization accelerator (F-1) is dissolved in the form of powder, the polymerization accelerator (F-1) having too large an average particle diameter tends to settle out. Therefore, the average particle diameter thereof is preferably 500 µm or less, more preferably 100 µm or less, and even more preferably 50 µm or less. On the other hand, too small an average particle diameter excessively increases the specific surface area of the powder, resulting in a decrease of the amount of the polymerization accelerator (F-1) dispersible in the composition. Therefore, the average particle diameter thereof is preferably 0.01 µm or more. That is, the average particle diameter of the polymerization accelerator (F-1) is preferably in the range of 0.01 to 500 µm, more preferably in the range of 0.01 to 100 µm, and even more preferably in the range of 0.01 to 50 µm.

The shape of the polymerization accelerator (F-1) dispersed in the form of powder is not particularly limited. Examples thereof include various shapes such as spherical, needle, sheet, and crushed shapes. The polymerization accelerator (F-1) can be produced by a conventionally known method, such as crushing, freeze-drying, or reprecipitation. The polymerization accelerator (F-1) can be obtained, for example, by any of the following methods.

Method 1: Method for obtaining the polymerization accelerator (F-1) by preparing an aqueous solution of the polymerization accelerator (F-1), freezing the aqueous solution at −50° C., and then vacuum-drying the frozen aqueous solution Method 2: Method for obtaining the polymerization accelerator (F-1) by preparing a saturated aqueous solution of the polymerization accelerator (F-1), pouring the aqueous solution into ethanol at 0° C., and filtering the resulting crystals, which are washed with ethanol and then air-dried Method 3: Method for obtaining the polymerization accelerator (F-1) by preparing a saturated aqueous solution of the polymerization accelerator (F-1), rapidly cooling the aqueous solution to 0° C., and then filtering and air-drying the resulting crystals Method 4: Method for obtaining the polymerization accelerator (F-1) by mechanical crushing and sieving The average particle diameter of the powder of the polymerization accelerator (F-1) can be calculated as the volume average particle diameter after image analysis of an electron microscope photograph of 100 or more particles with the use of an image-analyzing particle size distribution analysis software (Mac-View manufactured by Mountech Co., Ltd.).

Among these methods for producing the polymerization accelerator (F-1), freeze-drying (method 1) and reprecipitation (method 2) are preferred and freeze-drying (method 1) is more preferred, in terms of the average particle diameter of the resulting powder.

Specific examples of the sulfinic acids and salts thereof, borate compounds, barbituric acid derivatives, triazine compounds, copper compounds, tin compounds, vanadium compounds, halogen compounds, aldehydes, thiol compounds, sulfites, hydrogen sulfites, and thiourea compounds that are used as the polymerization accelerator (F) include those disclosed in WO 2008/087977 A1.

One of the polymerization accelerators (F) of the present invention may be contained alone, or a combination of two or more thereof may be contained. The content of the polymerization accelerator (F) used in the present invention is not particularly limited. In terms of, for example, the curability of the resulting solvent-free dental adhesive composition, the content of the polymerization accelerator (F) is preferably 0.001 to 30 parts by mass, more preferably 0.01 to 10 parts by mass, and even more preferably 0.1 to 5 parts by mass, with respect to 100 parts by mass of the total polymerizable monomer components in the solvent-free dental adhesive composition. On the other hand, if the content of the polymerization accelerator (F) is less than 0.001 parts by mass, polymerization may not progress sufficiently and may cause a reduction in adhesive property. The content of the polymerization accelerator (F) is more suitably 0.05 parts by mass or more. If the content of the polymerization accelerator (F) is more than 30 parts by mass and the polymerizabilities of the polymerization initiators themselves are low, not only sufficient adhesive property may not be obtained but also precipitation from the solvent-free dental adhesive composition may occur. Therefore, the content of the polymerization accelerator (F) is more suitably 20 parts by mass or less.

[Filler (G)]

Depending on the embodiment employed, the solvent-free dental adhesive composition of the present invention may further comprise a filler (G). The filler (G) is typically classified broadly into an organic filler, an inorganic filler, and an organic-inorganic composite filler. The filler (G) may be used alone, or two or more thereof may be used in combination. Examples of the material of the organic filler include polymethyl methacrylate, polyethyl methacrylate, methyl methacrylate-ethyl methacrylate copolymer, cross-linked polymethyl methacrylate, cross-linked polyethyl methacrylate, polyamide, polyvinyl chloride, polystyrene, chloroprene rubber, nitrile rubber, ethylene-vinyl acetate copolymer, styrene-butadiene copolymer, acrylonitrile-styrene copolymer, and acrylonitrile-styrene-butadiene copolymer. One of these may be used alone or a mixture of two or more thereof can be used. The shape of the organic filler is not particularly limited, and the particle diameter of the filler used can be selected as appropriate. In terms of the characteristics such as handling properties and mechanical strength of the resulting solvent-free dental adhesive composition, the average particle diameter of the organic filler is preferably 0.001 to 50 µm and more preferably 0.001 to 10 µm.

Examples of the material of the inorganic filler include quartz, silica, alumina, silica-titania, silica-titania-barium oxide, silica-zirconia, silica-alumina, lanthanum glass, borosilicate glass, soda glass, barium glass, strontium glass, glass ceramic, aluminosilicate glass, barium boroaluminosilicate glass, strontium boroaluminosilicate glass, fluoroaluminosilicate glass, calcium fluoroaluminosilicate glass, strontium fluoroaluminosilicate glass, barium fluoroaluminosilicate glass, and strontium calcium fluoroaluminosilicate glass. These may also be used alone or as a mixture of two or more thereof. The shape of the inorganic filler is not particularly limited, and the particle diameter of the filler used can be selected as appropriate. In terms of the characteristics such as handling properties and mechanical strength of the resulting composition, the average particle diameter of the inorganic filler is preferably 0.001 to 50 µm and more preferably 0.001 to 10 µm.

Examples of the shape of the inorganic filler include an irregular shape and a spherical shape. The inorganic filler used is preferably a spherical filler in terms of enhancement of the mechanical strength of the composition. Furthermore, the use of a spherical filler is also advantageous in that when the solvent-free dental adhesive composition of the present invention is used as a self-adhesive dental composite resin, a composite resin having excellent surface gloss can be obtained. The term "spherical filler" as used herein refers to a filler whose particles are rounded in shape as observed in a unit area of field of view in a photograph of the filler taken by an electron microscope and have an average aspect ratio of 0.6 or more calculated as an average of values determined by dividing a diameter of each particle in a direction perpendicular to the maximum diameter of the particle by the maximum diameter. The average particle diameter of the spherical filler is preferably 0.05 to 5 µm. An average particle diameter of less than 0.05 µm could cause a lower degree of filling of the compound with the spherical filler and hence reduced mechanical strength. An average particle diameter of more than 5 µm could cause a reduction in the surface area of the spherical filler, resulting in a failure to obtain a cured product formed of the solvent-free dental adhesive composition and having high mechanical strength.

The inorganic filler may be surface-treated beforehand with a commonly-known surface treatment agent such as a silane coupling agent where necessary in order to adjust the flowability of the solvent-free dental adhesive composition. Examples of the surface treatment agent include vinyltrimethoxysilane, vinyltriethoxysilane, vinyltrichlorosilane, vinyltri(β-methoxyethoxy)silane, γ-methacryloyloxypropyltrimethoxysilane, 8-methacryloyloxyoctyltrimethoxysilane, 11-methacryloyloxyundecyltrimethoxysilane, γ-glycidoxypropyltrimethoxysilane, γ-mercaptopropyltrimethoxysilane, and γ-aminopropyltriethoxysilane.

The organic-inorganic composite filler used in the present invention is obtainable by adding a polymerizable monomer to the above inorganic filler, forming the mixture into a paste, then subjecting the paste to polymerization, and crushing the resulting polymer product. The organic-inorganic composite filler used can be, for example, a TMPT filler (obtainable by mixing trimethylolpropane methacrylate and a silica filler, subjecting the mixture to polymerization, and then crushing the resulting polymer product). The shape of the organic-inorganic composite filler is not particularly limited, and the particle diameter of the filler used can be selected as appropriate. In terms of the characteristics such as handling properties and mechanical strength of the resulting composition, the average particle diameter of the organic-inorganic composite filler is preferably 0.001 to 50 µm and more preferably 0.001 to 10 µm.

In the present specification, the average particle diameter of the filler can be determined by laser diffraction scattering method or by electron microscope observation of the particles. Specifically, the laser diffraction scattering method is convenient for particle diameter measurement on particles with a diameter of 0.1 µm or more, and electron microscope observation is convenient for particle diameter measurement on ultrafine particles with a diameter of less than 0.1 µm. The particle diameter of 0.1 µm is a value determined by the laser diffraction scattering method.

To be specific about the laser diffraction scattering method, for example, the average particle diameter can be measured using a 0.2% aqueous solution of sodium hexametaphosphate as a dispersion medium by means of a laser diffraction particle size distribution analyzer (SALD-2300 manufactured by Shimadzu Corporation).

To be more specific about the electron microscope observation, for example, the average particle diameter can be determined by taking a photograph of particles by means of an electron microscope (S-4000 manufactured by Hitachi, Ltd.) and measuring the particle diameters of (200 or more) particles observed in a unit area of field of view in the photograph by the use of an image-analyzing particle size distribution analysis software (Mac-View manufactured by Mountech Co., Ltd.). In this case, the particle diameter of each particle is determined as an arithmetic mean of the maximum and minimum lengths of the particle, and, from the thus determined particle diameters and the number of the particles, the average primary particle diameter is calculated.

In the present invention, two or more types of fillers differing in material, particle size distribution, and form, may be mixed or used in combination. Additionally, particles other than the filler may be accidentally contained as impurities to the extent that the other particles do not impair the effect of the present invention.

The content of the filler (G) used in the present invention is not particularly limited. The content of the filler (G) is preferably 0 to 2000 parts by mass with respect to 100 parts by mass of the total polymerizable monomer components in the solvent-free dental adhesive composition. The suitable content of the filler (G) greatly differs depending on the embodiment employed. Therefore, along with the later-described descriptions of specific embodiments of the solvent-free dental adhesive composition of the present invention, the suitable content of the filler (G) for each embodiment will be shown. A preferred embodiment is a solvent-free dental adhesive composition in which the filler (G) is an inorganic filler.

[Fluorine Ion-Releasing Material]

The solvent-free dental adhesive composition of the present invention may further comprise a fluorine ion-releasing material. The solvent-free dental adhesive composition in which the fluorine ion-releasing material is contained can impart acid resistance to tooth structures. Examples of the fluorine ion-releasing material include metal fluorides such as sodium fluoride, potassium fluoride, sodium monofluorophosphate, lithium fluoride, and ytterbium fluoride. One of these fluorine ion-releasing materials may be contained alone, or a combination of two or more thereof may be contained.

Furthermore, an additive such as a pH adjuster, a polymerization inhibitor, a thickener, a colorant, a fluorescent agent, or a flavor may be contained in the solvent-free dental adhesive composition to the extent that the effect of the present invention is not impaired. One of the additives may be used alone or two or more thereof may be used in combination. Additionally, an antibacterial substance such as cetylpyridinium chloride, benzalkonium chloride, (meth)acryloyloxydodecylpyridinium bromide, (meth)acryloyloxyhexadecylpyridinium chloride, (meth)acryloyloxydecylammonium chloride, or triclosan may be contained in the solvent-free dental adhesive composition. One of the antibacterial substances may be used alone or two or more thereof may be used in combination.

A commonly-known dye or pigment may be contained in the solvent-free dental adhesive composition of the present invention. Such a dye or pigment may be used alone or two or more thereof may be used in combination.

The solvent-free dental adhesive composition of the present invention can be used, for example, for a dental bonding material, a self-adhesive dental composite resin, a dental cement, a pit and fissure sealant, a mobile tooth fixing material, and an orthodontic adhesive. The solvent-free dental adhesive composition of the present invention can be suitably used particularly as a dental bonding material, a self-adhesive dental composite resin, and a dental cement. When used as such, the solvent-free dental adhesive composition of the present invention may be a two-part (two-pack or two-paste) composition in which the components thereof are divided into two. Specific embodiments in which the solvent-free dental adhesive composition is employed will be described hereinafter.

<Dental Bonding Material>

The use of the solvent-free dental adhesive composition as a dental bonding material is one of the suitable embodiments of the present invention. The dental bonding material is a bonding material allowing a demineralization step, a penetration step, and a curing step to be performed in one step and being substantially free of water and an organic solvent. Examples of the dental bonding material include a two-part material used by mixing two separated parts which are a liquid A and a liquid B immediately before use and a one-part (one-pack or one-paste) material which can be directly used. In particular, the use of a one-part material is advantageous because of much simplified steps. The solvent-free dental adhesive composition used for the dental bonding material is preferably a composition comprising the acid group-containing polymerizable monomer (A), the hydrophobic polymerizable monomer (B) having no acid group, the hydrophilic polymerizable monomer (D) having no acid group, the photopolymerization initiator (C), the photopolymerization initiator (E), the polymerization accelerator (F), and the filler (G).

The dental bonding material preferably contains 1 to 90 parts by mass of the acid group-containing polymerizable monomer (A), 1 to 99 parts by mass of the hydrophobic polymerizable monomer (B) having no acid group, and 0 to 90 parts by mass of the hydrophilic polymerizable monomer (D) having no acid group, more preferably contains 1 to 80 parts by mass of the acid group-containing polymerizable monomer (A), 10 to 99 parts by mass of the hydrophobic polymerizable monomer (B) having no acid group, and 0 to 80 parts by mass of the hydrophilic polymerizable monomer (D) having no acid group, and even more preferably contains 1 to 50 parts by mass of the acid group-containing polymerizable monomer (A), 40 to 99 parts by mass of the hydrophobic polymerizable monomer (B) having no acid group, and 0 to 50 parts by mass of the hydrophilic polymerizable monomer (D) having no acid group, in 100 parts by mass of the total polymerizable monomer components in the solvent-free dental adhesive composition. Additionally, the dental bonding material preferably contains 0.001 to 30 parts by mass of the photopolymerization initiator (C), 0.001 to 30 parts by mass of the photopolymerization initiator (E), 0.001 to 20 parts by mass of the polymerization accelerator (F), and 0 to 100 parts by mass of the filler (G), and more preferably contains 0.05 to 10 parts by mass of the photopolymerization initiator (C), 0.05 to 10 parts by mass of the photopolymerization initiator (E), 0.05 to 10 parts by mass of the polymerization accelerator (F), and 1 to 50 parts by mass of the filler (G), with respect to 100 parts by mass of the total polymerizable monomer components.

<Self-Adhesive Dental Composite Resin>

The use of the solvent-free dental adhesive composition as a self-adhesive dental composite resin is another suitable embodiment of the present invention. In particular, composite resins that are filling composite resins having adhesive property have been under development in recent years. The use of such composite resins is advantageous because of steps much more simplified than those of the adhesion system of the above dental bonding material. The solvent-free dental adhesive composition used as a self-adhesive dental composite resin preferably comprises the acid group-containing polymerizable monomer (A), the hydrophobic polymerizable monomer (B) having no acid group, the hydrophilic polymerizable monomer (D) having no acid group, the photopolymerization initiator (C), the photopolymerization initiator (E), the polymerization accelerator (F), and the filler (G).

The self-adhesive dental composite resin preferably contains 1 to 90 parts by mass of the acid group-containing polymerizable monomer (A), 1 to 99 parts by mass of the hydrophobic polymerizable monomer (B) having no acid group, and 0 to 90 parts by mass of the hydrophilic polymerizable monomer (D) having no acid group, more preferably contains 1 to 80 parts by mass of the acid group-containing polymerizable monomer (A), 10 to 99 parts by mass of the hydrophobic polymerizable monomer (B) having no acid group, and 0 to 80 parts by mass of the hydrophilic polymerizable monomer (D) having no acid group, and even more preferably contains 1 to 50 parts by mass of the acid group-containing polymerizable monomer (A), 40 to 99 parts by mass of the hydrophobic polymerizable monomer (B) having no acid group, and 0 to 50 parts by mass of the hydrophilic polymerizable monomer (D) having no acid group, in 100 parts by mass of the total polymerizable monomer components in the solvent-free dental adhesive composition. Additionally, the self-adhesive dental composite resin preferably contains 0.001 to 30 parts by mass of the photopolymerization initiator (C), 0.001 to 30 parts by mass of the photopolymerization initiator (E), 0.001 to 20 parts by mass of the polymerization accelerator (F), and 50 to 2000 parts by mass of the filler (G), and more preferably contains 0.05 to 10 parts by mass of the photopolymerization initiator (C), 0.05 to 10 parts by mass of the photopolymerization initiator (E), 0.05 to 10 parts by mass of the polymerization accelerator (F), and 100 to 1500 parts by mass of the filler (G), with respect to 100 parts by mass of the total polymerizable monomer components.

<Dental Cement>

The use of the solvent-free dental adhesive composition as a dental cement is another suitable embodiment of the present invention. Suitable examples of the dental cement include a resin cement, a glass ionomer cement, and a resin-reinforced glass ionomer cement. A self-etching primer, for example, may be used as a pretreatment material for the dental cement. The solvent-free dental adhesive composition used as a dental cement preferably comprises the acid group-containing polymerizable monomer (A), the hydrophobic polymerizable monomer (B) having no acid group, the hydrophilic polymerizable monomer (D) having no acid group, the photopolymerization initiator (C), the photopolymerization initiator (E), the chemical polymerization initiator, the polymerization accelerator (F), and the filler (G).

Meanwhile, to exhibit high initial bond strength and high bond durability also to a tooth structure in dry condition and a high dentin cohesive failure rate also on a tooth structure in dry condition, the dental cement preferably contains 1 to 90 parts by mass of the acid group-containing polymerizable monomer (A), 1 to 99 parts by mass of the hydrophobic polymerizable monomer (B) having no acid group, and 0 to 90 parts by mass of the hydrophilic polymerizable monomer (D) having no acid group, more preferably contains 1 to 80 parts by mass of the acid group-containing polymerizable monomer (A), 10 to 99 parts by mass of the hydrophobic polymerizable monomer (B) having no acid group, and 0 to 80 parts by mass of the hydrophilic polymerizable monomer (D) having no acid group, and even more preferably contains 1 to 50 parts by mass of the acid group-containing polymerizable monomer (A), 40 to 99 parts by mass of the hydrophobic polymerizable monomer (B) having no acid group, and 0 to 50 parts by mass of the hydrophilic polymerizable monomer (D) having no acid group, in 100 parts by mass of the total polymerizable monomer components in the solvent-free dental adhesive composition. Additionally, the dental cement preferably contains 0.001 to 30 parts by mass of the photopolymerization initiator (C), 0.001 to 30 parts by mass of the photopolymerization initiator (E), 0.001 to 30 parts by mass of the chemical polymerization initiator, 0.001 to 20 parts by mass of the polymerization accelerator (F), and 50 to 2000 parts by mass of the filler (G), and more preferably contains 0.05 to 10 parts by mass of the photopolymerization initiator (C), 0.05 to 10 parts by mass of the photopolymerization initiator (E), 0.05 to 10 parts by mass of the chemical polymerization initiator, 0.05 to 10 parts by mass of the polymerization accelerator (F), and 100 to 1500 parts by mass of the filler (G), with respect to 100 parts by mass of the total polymerizable monomer components.

For any of the above suitable embodiments, namely, the dental bonding material, the self-adhesive dental composite resin, and the dental cement, adjustment of the types and contents of the components, and addition or omission of some of the components can be done on the basis of the foregoing description in the present specification.

As described above, in the solvent-free dental adhesive composition of the present invention may be incorporated a small amount (for example, 3 mass % or less with respect to the composition) of moisture or an organic solvent as long as no trouble such as insufficient curing or delay in curing is caused. The content of water and an organic solvent is preferably less than 1 mass % and more preferably less than 0.1 mass % with respect to the composition.

The present invention encompasses embodiments obtainable by combining the above embodiments in various manners within the technical scope of the present invention as long as the effect of the present invention can be obtained.

EXAMPLES

The present invention will now be described in more detail by way of Examples. It should be noted that the present invention is not limited to Examples given below. Not all combinations of features described in Examples are necessarily essential for the solution to the problem of the present invention. Components used in the following Examples and Comparative Examples, their abbreviations and structures, and testing methods are as follows.

[Acid Group-Containing Polymerizable Monomer (A)]

MDP: 10-methacryloyloxydecyl dihydrogen phosphate

[Hydrophobic Polymerizable Monomer (B) Having No Acid Group]

DD: 1,10-decanediol dimethacrylate

MAEA: N-methacryloyloxyethyl acrylamide

[Hydrophilic Polymerizable Monomer (D) Having No Acid Group]

HEMA: 2-hydroxyethyl methacrylate

DEAA: N,N-diethylacrylamide

[Photopolymerization Initiator (C)]
Photopolymerization Initiator (C-1)
  BAPO-PEG950: a compound represented by the following formula (5) and having polyethylene glycol methyl ether methacrylate (Mn=950) as a raw material

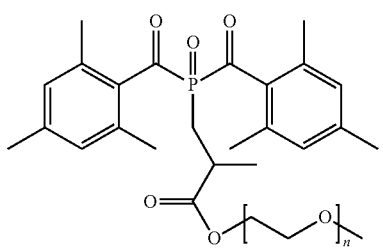

(5)

Photopolymerization Initiator (C-2)
  CQ-COONa: a compound represented by the following formula (6)

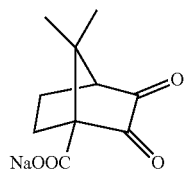

(6)

CQ-COOLi: a compound represented by the following formula (7)

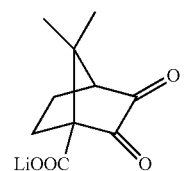

(7)

[Photopolymerization Initiator (E)]
  CQ: dl-camphorquinone
  TMDPO: 2,4,6-trimethylbenzoyldiphenylphosphine oxide
  BAPO: bis(2,4,6-trimethylbenzoyl)phenylphosphine oxide
[Polymerization Accelerator (F)]
  DMAB: Ethyl 4-(N,N-Dimethylamino)Benzoate
Polymerization Accelerator (F-1)
  Polymerization accelerator 1: a compound represented by the following formula (8)

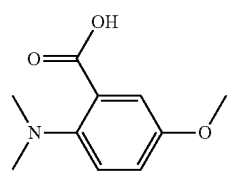

(8)

Polymerization accelerator 2: a compound represented by the following formula (9)

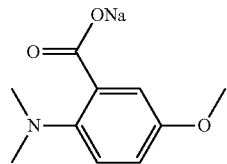

(9)

Polymerization accelerator 3: a compound represented by the following formula (10)

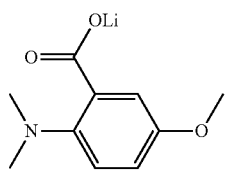

(10)

[Filler (G)]
  Inorganic filler 1: Fine particle silica "Aerosil R 972" manufactured by Nippon Aerosil Co., Ltd., average particle diameter: 16 nm
  Inorganic filler 2: Fine particle silica "Aerosil 380" manufactured by Nippon Aerosil Co., Ltd., average particle diameter: 7 nm
  Inorganic filler 3: Silane-treated silica powder
  Silica powder (manufactured by Nitchitsu Co., Ltd. under the trade name Hi-Silica) was ground in a ball mill to obtain a pulverized silica powder. The average particle diameter of the pulverized silica powder thus obtained was measured using a laser diffraction particle size distribution analyzer (manufactured by Shimadzu Corporation, Model "SALD-2300"). The average particle diameter was 2.2 µm. 100 parts by mass of this pulverized silica powder was surface-treated with 4 parts by mass of γ-methacryloyloxypropyltrimethoxysilane by a conventional method. Thus, a silane-treated silica powder was obtained.
  Inorganic filler 4: Silane-treated barium glass powder
  Barium glass (manufactured by Esstech, Inc. under the trade name "E-3000") was ground in a ball mill to obtain a barium glass powder. The average particle diameter of the barium glass powder thus obtained was measured using a laser diffraction particle size distribution analyzer (manufactured by Shimadzu Corporation, Model "SALD-2300"). The average particle diameter was 2.4 µm. 100 parts by mass of this barium glass powder was surface-treated with 3 parts by mass of γ-methacryloyloxypropyltrimethoxysilane by a conventional method. Thus, a silane-treated barium glass powder was obtained.
[Others]
  BHT: 2,6-di-t-butyl-4-methylphenol (stabilizer (polymerization inhibitor))

Example 1 and Comparative Example 1
Employment of Solvent-Free Dental Adhesive Composition for Dental Bonding Material Examples 1-1 to 1-15 and Comparative Examples 1-1 to 1-4

Dental bonding materials of Examples 1-1 to 1-15 and Comparative Examples 1-1 to 1-4 were prepared by mixing and dispersing the components described in Tables 1 and 2 at ordinary temperature. Then, the tensile bond strength to dentin was measured according to the method described below for the dental bonding materials obtained. Tables 1 and 2 show the contents (parts by mass) of the components of the dental bonding materials of Examples and Comparative Examples and the test results for Examples and Comparative Examples.

[Tensile Bond Strength to Dentin]

The labial surfaces of bovine mandibular incisors were each ground with #80 silicon carbide paper (manufactured by Nihon Kenshi Co., Ltd.) under running water to obtain samples with an exposed flat dentin surface. Each of the obtained samples was further ground with #1000 silicon carbide paper (manufactured by Nihon Kenshi Co., Ltd.) under running water. After the completion of grinding, each sample was dried by removing water from its surface by air-blowing. A smooth surface was thus obtained. To the dried smooth surface was attached an about 150-μm-thick adhesive tape having a circular hole of 3-mm diameter, so that an adhesive area was defined.

Each of the dental bonding materials prepared in Examples and Comparative Examples was applied within the circular hole with a brush and left for 10 seconds, after which the surface in the circular hole was air-blown. Subsequently, the applied dental bonding material was cured by 10-second light irradiation on the surface using a dental LED light irradiation device (manufactured by Morita Corporation under the trade name "Pencure 2000").

A dental filling composite resin (manufactured by KURARAY NORITAKE DENTAL INC. under the trade name "CLEARFIL (registered trademark) AP-X") was applied to the surface of the obtained cured product of the dental bonding material, and was covered with a release film (made of polyester). Next, a glass slide was placed on and pressed against the release film to flatten the surface of the composite resin. Subsequently, the applied composite resin was cured by 20-second light irradiation through the release film using an irradiation device "VALO".

To the surface of the obtained cured product of the dental filling composite resin was adhered an end face (circular cross section) of a cylindrical stainless steel rod (diameter: 7 mm, length: 2.5 cm) using a commercially-available dental resin cement (manufactured by Kuraray Noritake Dental Inc. under the trade name "PANAVIA (registered trademark) 21") to obtain a sample. After the adhesion, the sample was left to stand at room temperature for 30 minutes and then immersed in distilled water to obtain an adhesion test sample. There were produced 20 such adhesion test samples. All samples immersed in distilled water were left to stand in a thermostat maintained at 37° C. for 24 hours. To evaluate the initial bond strength, 10 out of the 20 samples were measured for their tensile bond strength immediately after left to stand for 24 hours. To evaluate the bond durability, the remaining 10 samples were further subjected to 4000 cycles of thermal cycling, one cycle of which consists of immersion in 4° C. cold water and 60° C. hot water for 1 minute each, and then measured for the tensile bond strength.

The tensile bond strength of the adhesion test samples was measured using a universal testing machine (manufactured by Shimadzu Corporation) with a crosshead speed set at 2 mm/minute. The average was defined as the tensile bond strength.

TABLE 1

| Component (parts by mass) | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 | Ex. 1-11 | Ex. 1-12 | Ex. 1-13 | Ex. 1-14 | Ex. 1-15 |
|---|---|---|---|---|---|---|---|---|---|---|---|---|---|---|---|---|
| Acid group containing polymerizable monomer (A) | MDP | 3 | 3 | 3 | 3 | 3 | 3 | 3 | 3 | 3 | 3 | 3 | 3 | 3 | 3 | 3 |
| Hydrophobic polymerizable monomer (B) having no acid group | DD | 77 | 77 | 77 | 75 | 77 | 97 | 77 | 77 | 77 | 77 | 77 | 77 | 77 | 62 | 42 |
| | MAEA | 10 | 15 | 15 | 15 | 20 | — | 20 | 20 | 20 | 20 | 15 | 20 | 15 | 15 | 5 |
| Hydrophilic polymerizable monomer (D) having no acid group | HEMA | 10 | 5 | 5 | 5 | — | — | — | — | — | — | 5 | — | 5 | 20 | 50 |
| | DEAA | — | — | — | — | — | — | — | — | — | — | — | — | — | — | — |
| Photopolymerization initiator (C) | BAPO-PEG950 | 0.5 | 0.3 | 0.5 | 1 | 0.5 | 0.5 | — | — | — | — | — | 0.5 | 0.5 | 0.5 | 0.5 |
| | CQ-COONa | — | — | — | — | — | — | 0.5 | 0.5 | 0.5 | 0.5 | 0.5 | — | — | — | — |
| | CQ-COOLi | — | — | — | — | — | — | — | — | — | 0.5 | 0.5 | — | — | — | — |
| Photopolymerization initiator (E) | CQ | 0.6 | 0.6 | 0.6 | 0.6 | 0.6 | 0.6 | 0.6 | 0.6 | 0.6 | 0.6 | 0.3 | 0.3 | 0.3 | 0.6 | 0.6 |
| | TMDPO | — | — | — | — | — | — | — | — | — | — | — | 0.3 | — | — | — |
| | BAPO | — | — | — | — | — | — | — | — | — | — | — | — | 0.3 | — | — |
| Polymerization accelerator (F) | DMAB | 0.8 | 0.8 | 0.8 | 0.8 | 0.8 | 0.8 | 0.8 | 0.8 | 0.8 | 0.8 | 0.6 | 0.6 | 0.6 | 0.8 | 0.8 |
| | Polymerization accelerator 1 | — | — | — | — | — | — | 0.5 | — | — | — | — | — | — | — | — |
| | Polymerization accelerator 2 | — | — | — | — | — | — | — | 0.5 | — | 0.5 | 0.5 | — | — | — | — |
| | Polymerization accelerator 3 | — | — | — | — | — | — | — | — | 0.5 | — | — | — | — | — | — |
| Others | BHT | 0.1 | 0.1 | 0.1 | 0.1 | 0.1 | 0.1 | 0.1 | 0.1 | 0.1 | 0.1 | 0.1 | 0.1 | 0.1 | 0.1 | — |
| Filler (G) | Inorganic filler 1 | — | — | — | — | — | — | — | — | — | — | — | — | 3 | — | — |
| Tensile bond strength to dentin (MPa) | Initial bond strength | 16 | 16 | 19 | 18 | 18 | 17 | 15 | 18 | 18 | 17 | 20 | 17 | 18 | 16 | 14 |
| | Bond durability | 14 | 15 | 17 | 16 | 16 | 14 | 13 | 17 | 16 | 16 | 18 | 15 | 17 | 14 | 13 |

TABLE 2

| Component (parts by mass) | | Comparative Example 1-1 | Comparative Example 1-2 | Comparative Example 1-3 | Comparative Example 1-4 |
|---|---|---|---|---|---|
| Acid group-containing polymerizable monomer (A) | MDP | 3 | 3 | 3 | 0 |
| Hydrophobic polymerizable monomer (B) having no acid group | DD | 77 | 77 | 77 | 80 |
| | MAEA | 20 | 20 | 20 | 20 |
| Hydrophilic polymerizable monomer (D) having no acid group | HEMA | — | — | — | — |
| | DEAA | — | — | — | — |
| Photopolymerization initiator (C) | BAPO-PEG950 | — | — | — | 0.5 |
| | CQ-COONa | — | — | — | — |
| | CQ-COOLi | — | — | — | — |
| Photopolymerization initiator (E) | CQ | 0.6 | 0.6 | 0.6 | 0.6 |
| | TMDPO | — | 0.5 | — | — |
| | BAPO | — | — | 0.5 | — |
| Polymerization accelerator (F) | DMAB | 0.8 | 0.8 | 0.8 | 0.8 |
| | Polymerization accelerator 1 | — | — | — | — |
| | Polymerization accelerator 2 | — | — | — | — |
| | Polymerization accelerator 3 | — | — | — | — |
| Others | BHT | 0.1 | 0.1 | 0.1 | 0.1 |
| Filler (G) | Inorganic filler 1 | — | — | — | — |
| Tensile bond strength to dentin (MPa) | Initial bond strength | 11 | 10 | 11 | 2 |
| | Bond durability | 9 | 8 | 9 | 0 |

As shown in Table 1, the dental bonding materials (Examples 1-1 to 1-15) according to the present invention exhibited an initial bond strength of 14 MPa or more to dentin and a bond durability of 13 MPa or more to dentin. This suggests an increase in polymerization curability of the adhesive interface portion and the inside of the resin-impregnated layer. On the other hand, as shown in Table 2, the dental bonding materials (Comparative Examples 1-1 to 1-4) not including the photopolymerization initiator (C) nor the acid group-containing polymerizable monomer (A) exhibited an initial bond strength of 11 MPa or less to dentin and a bond durability of 9 MPa or less to dentin. This confirms that the polymerization curability of the adhesive interface portion and that of the inside of the resin-impregnated layer were insufficient.

Examples 2 and Comparative Example 2
Employment of Solvent-Free Dental Adhesive Composition for Self-Adhesive Dental Composite Resin Examples 2-1 to 2-11 and Comparative Examples 2-1 to 2-4

Self-adhesive dental composite resins of Examples 2-1 to 2-11 and Comparative Examples 2-1 to 2-4 were prepared by mixing and kneading the components described in Tables 3 and 4 at ordinary temperature. Then, the tensile bond strength to dentin was measured according to the method described below for these self-adhesive dental composite resins. Tables 3 and 4 show the contents (parts by mass) of the components of the self-adhesive dental composite resins of Examples and Comparative Examples and the test results for Examples and Comparative Examples.

[Tensile Bond Strength to Dentin]

The labial surfaces of bovine mandibular incisors were each ground with #80 silicon carbide paper (manufactured by Nihon Kenshi Co., Ltd.) under running water to obtain samples with an exposed flat dentin surface. Each of the obtained samples was further ground with #1000 silicon carbide paper (manufactured by Nihon Kenshi Co., Ltd.) under running water. After the completion of grinding, each sample was dried by removing water from its surface by air-blowing. To the dried smooth surface was attached an about 150-μm-thick adhesive tape having a circular hole of 3-mm diameter, so that an adhesive area was defined.

Each of the self-adhesive dental composite resins produced in Examples and Comparative Examples was applied within the circular hole, and was covered with a release film (made of polyester). Next, a glass slide was placed on and pressed against the release film to flatten the surface of the applied self-adhesive dental composite resin. Subsequently, the applied self-adhesive dental composite resin was cured by 10-second light irradiation through the release film using a dental LED light irradiation device (manufactured by ULATRADENT PRODUCTS, INC. under the trade name "VALO").

To the surface of the obtained cured product of the self-adhesive dental composite resin was adhered an end face (circular cross section) of a cylindrical stainless steel rod (diameter: 7 mm, length: 2.5 cm) using a commercially-available dental resin cement (manufactured by Kuraray Noritake Dental Inc. under the trade name "PANAVIA (registered trademark) 21"). After the adhesion, the sample was left to stand at room temperature for 30 minutes and then immersed in distilled water to obtain an adhesion test sample. There were produced 20 such adhesion test samples. All samples immersed in distilled water were left to stand in a thermostat maintained at 37° C. for 24 hours. To evaluate the initial bond strength, 10 out of the 20 samples were measured for their tensile bond strength immediately after left to stand for 24 hours. To evaluate the bond durability, the remaining 10 samples were further subjected to 4000 cycles of thermal cycling, one cycle of which consists of immersion in 4° C. cold water and 60° C. hot water for 1 minute each, and then measured for the tensile bond strength.

The tensile bond strength of the adhesion test samples was measured using a universal testing machine (manufactured by Shimadzu Corporation) with a crosshead speed set at 2 mm/minute. The average was defined as the tensile bond strength.

TABLE 3

| Component (parts by mass) | | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 | Ex. 2-10 | Ex. 2-11 |
|---|---|---|---|---|---|---|---|---|---|---|---|---|
| Acid group-containing polymerizable monomer (A) | MDP | 10 | 10 | 10 | 10 | 10 | 10 | 10 | 10 | 10 | 10 | 10 |
| Hydrophobic polymerizable monomer (B) having no acid group | DD | 70 | 70 | 70 | 70 | 70 | 90 | 70 | 70 | 70 | 70 | 70 |
| | MAEA | 10 | 15 | 15 | 15 | 20 | — | 20 | 20 | 20 | 20 | 20 |
| Hydrophilic polymerizable monomer (D) having no acid group | HEMA | 10 | 5 | 5 | 5 | — | — | — | — | — | — | 17.2 |
| | DEAA | — | — | — | — | — | — | — | — | — | 5 | — |
| Photopolymerization initiator (C) | BAPO-PEG950 | 0.2 | 0.1 | 0.2 | 0.5 | 0.2 | 0.2 | — | — | — | 0.2 | 0.2 |
| | CQ-COONa | — | — | — | — | — | — | 0.2 | — | 0.2 | — | — |
| | CQ-COOLi | — | — | — | — | — | — | — | 0.2 | — | — | — |
| Photopolymerization initiator (E) | CQ | 0.2 | 0.2 | 0.2 | 0.2 | 0.2 | 0.2 | 0.2 | 0.2 | 0.2 | 0.2 | 0.2 |
| | TMDPO | — | — | — | — | — | — | — | — | — | — | 0.3 |
| | BAPO | — | — | — | — | — | — | — | — | — | — | — |
| Polymerization accelerator (F) | DMAB | 0.4 | 0.4 | 0.4 | 0.4 | 0.4 | 0.4 | 0.4 | 0.4 | 0.4 | 0.4 | 0.4 |
| | Polymerization accelerator 1 | — | — | — | — | — | — | 0.4 | — | — | — | — |
| | Polymerization accelerator 2 | — | — | — | — | — | — | — | — | 0.4 | — | — |
| | Polymerization accelerator 3 | — | — | — | — | — | — | — | 0.4 | — | — | — |
| Others | BHT | 0.05 | 0.05 | 0.05 | 0.05 | 0.05 | 0.05 | 0.05 | 0.05 | 0.05 | 0.05 | 0.05 |
| Filler (G) | Inorganic filler 2 | 20 | 20 | 20 | 20 | 20 | 20 | 20 | 20 | 20 | 20 | 20 |
| | Inorganic filler 3 | 280 | 280 | 280 | 280 | 280 | 280 | 280 | 280 | 280 | — | 280 |
| | Inorganic filler 4 | — | — | — | — | — | — | — | — | — | 280 | — |
| Tensile bond strength to dentin (MPa) | Initial bond strength | 15 | 14 | 16 | 15 | 15 | 16 | 14 | 15 | 15 | 16 | 14 |
| | Bond durability | 14 | 13 | 15 | 15 | 14 | 14 | 12 | 14 | 15 | 16 | 13 |

TABLE 4

| Component (parts by mass) | | Comparative Example 2-1 | Comparative Example 2-2 | Comparative Example 2-3 | Comparative Example 2-4 |
|---|---|---|---|---|---|
| Acid group-containing polymerizable monomer (A) | MDP | 10 | 10 | 10 | 0 |
| Hydrophobic polymerizable monomer (B) having no acid group | DD | 70 | 70 | 70 | 70 |
| | MAEA | 20 | 20 | 20 | 30 |
| Hydrophilic polymerizable monomer (D) having no acid group | HEMA | — | — | — | — |
| | DEAA | — | — | — | — |
| Photopolymerization initiator (C) | BAPO-PEG950 | — | — | — | 0.3 |
| | CQ-COONa | — | — | — | — |
| | CQ-COOLi | — | — | — | — |
| Photopolymerization initiator (E) | CQ | 0.4 | 0.2 | 0.2 | 0.2 |
| | TMDPO | — | 0.2 | — | — |
| | BAPO | — | — | 0.2 | — |
| Polymerization accelerator (F) | Polymerization accelerator 1 | — | — | — | — |
| | Polymerization accelerator 2 | — | — | — | — |
| | Polymerization accelerator 3 | — | — | — | — |

TABLE 4-continued

| Component (parts by mass) | | Comparative Example 2-1 | Comparative Example 2-2 | Comparative Example 2-3 | Comparative Example 2-4 |
|---|---|---|---|---|---|
| Others | BHT | 0.05 | 0.05 | 0.05 | 0.05 |
| Filler (G) | Inorganic filler 2 | 20 | 20 | 20 | 20 |
| | Inorganic filler 3 | 280 | 280 | 280 | 280 |
| | Inorganic filler 4 | — | — | — | — |
| Tensile bond strength to dentin (MPa) | Initial bond strength | 7 | 7 | 7 | 1 |
| | bond durability | 4 | 5 | 5 | 0 |

As shown in Table 3, the self-adhesive dental composite resins (Examples 2-1 to 2-11) according to the present invention exhibited an initial bond strength of 14 MPa or more to dentin and a bond durability of 12 MPa or more to dentin. This suggests an increase in polymerization curability of the adhesive interface portion and the inside of the resin-impregnated layer. On the other hand, as shown in Table 4, the self-adhesive dental composite resins (Comparative Examples 2-1 to 2-4) not including the photopolymerization initiator (C) nor the acid group-containing polymerizable monomer (A) exhibited an initial bond strength of 7 MPa or less to dentin and a bond durability of 5 MPa or less to dentin. This confirms that the polymerization curability of the adhesive interface portion and that of the inside of the resin-impregnated layer were insufficient.

INDUSTRIAL APPLICABILITY

The solvent-free dental adhesive composition according to the present invention is suitably used as a dental bonding material, a self-adhesive dental composite resin, and a dental cement in the field of dentistry.

The invention claimed is:

1. A solvent-free dental adhesive composition, comprising:
   an acid group-containing polymerizable monomer (A);
   a hydrophobic polymerizable monomer (B) having no acid group; and
   a photopolymerization initiator (C), wherein
   the photopolymerization initiator (C) comprises at least one selected from the group consisting of a compound (C-1) of formula (1) and a compound (C-2) of formula (2):

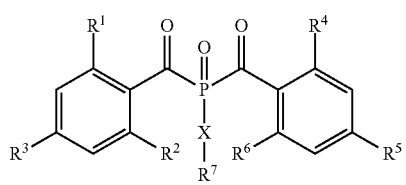

(1)

where $R^1$, $R^2$, $R^3$, $R^4$, $R^5$, and $R^6$ are each independently a linear or branched alkyl group having 1 to 4 carbon atoms or a halogen atom, X is a linear or branched alkylene group having 1 to 4 carbon atoms, and $R^7$ represents —CH(CH$_3$)COO(C$_2$H$_4$O)$_n$CH$_3$, where n represents an integer of 1 to 1000; and

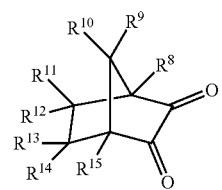

(2)

where $R^8$, $R^9$, $R^{10}$, $R^{11}$, $R^{12}$, $R^{13}$, $R^{14}$, and $R^{15}$ are each independently a hydrogen atom, a linear or branched alkyl group having 1 to 4 carbon atoms, a linear or branched alkoxy group having 1 to 4 carbon atoms, a halogen atom, —OH, or —COOY, and at least one of $R^8$ to $R^{15}$ is —COOY, where Y is an alkali metal ion, alkaline-earth metal ion, magnesium ion, pyridinium ion having an optionally substituted pyridine ring, or ammonium ion of a formula HN$^+$R$^{16}$R$^{17}$R$^{18}$ wherein $R^{16}$, $R^{17}$, and $R^{18}$ are each independently an organic group or a hydrogen atom.

2. The solvent-free dental adhesive composition according to claim 1, wherein
the photopolymerization initiator (C) comprises the compound (C-2), and
the solvent-free dental adhesive composition further comprises a compound (F-1) of formula (3) as a polymerization accelerator (F):

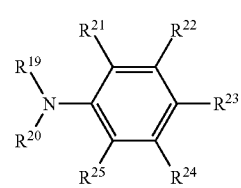

(3)

where $R^{19}$ and $R^{20}$ are each independently a linear or branched alkyl group having 1 to 4 carbon atoms, $R^{21}$, $R^{22}$, $R^{23}$, $R^{24}$, and $R^{25}$ are each independently a hydrogen atom, a linear or branched alkyl group having 1 to 4 carbon atoms, a linear or branched alkoxy group having 1 to 4 carbon atoms, a halogen atom, —OH, —COOH, or —COOY, and at least one of $R^{21}$ to $R^{25}$ is —COOH or —COOY, where Y represents an organic cation or an inorganic cation.

3. The solvent-free dental adhesive composition according to claim 2, wherein
$R^{19}$ and $R^{20}$ are each a methyl group or an ethyl group, one of the groups as $R^{21}$ to $R^{25}$ is —COOH or —COOY, and another one of the groups as $R^{21}$ to $R^{25}$ is —OH or a linear alkoxy group having 1 to 3 carbon atoms.

4. The solvent-free dental adhesive composition according to claim 2, wherein the compound (F-1) of formula (3) is at least one selected from the group consisting of a compound of formula (8), a compound of formula (9), and a compound of formula (10)

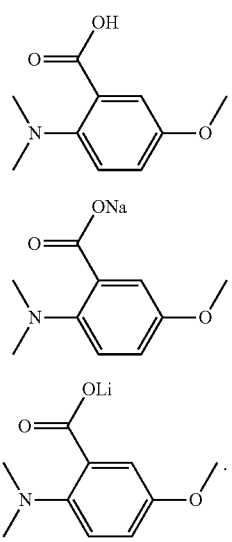

(8)

(9)

(10)

5. The solvent-free dental adhesive composition according to claim 1, wherein the photopolymerization initiator (C) comprises the compound (C-1) of formula (1).

6. The solvent-free dental adhesive composition according to claim 1, wherein
one of the groups as $R^8$ to $R^{15}$ is —COOY and the other groups as $R^8$ to $R^{15}$ are each a hydrogen atom or a methyl group.

7. The solvent-free dental adhesive composition according to claim 1, wherein X is a methylene group.

8. The solvent-free dental adhesive composition according to claim 1, further comprising a hydrophilic polymerizable monomer (D) having no acid group.

9. The solvent-free dental adhesive composition according to claim 8, wherein a content of the hydrophilic polymerizable monomer (D) with respect to a total mass of the hydrophobic polymerizable monomer (B) and the hydrophilic polymerizable monomer (D) is 50 mass % or less.

10. The solvent-free dental adhesive composition according to claim 1, wherein the acid group-containing polymerizable monomer (A) is a phosphate group-containing polymerizable monomer.

11. The solvent-free dental adhesive composition according to claim 1, further comprising a photopolymerization initiator (E) having a structure other than the formulae (1) and (2).

12. The solvent-free dental adhesive composition according to claim 11, wherein the photopolymerization initiator (E) is at least one selected from the group consisting of (bis)acylphosphine oxides, α-diketones, and coumarins.

13. The solvent-free dental adhesive composition according to claim 11, wherein a mass ratio between the photopolymerization initiator (C) and the photopolymerization initiator (E) is from 10:1 to 1:10.

14. The solvent-free dental adhesive composition according to claim 1, wherein the compound (C-1) of formula (1) is a compound of formula (5)

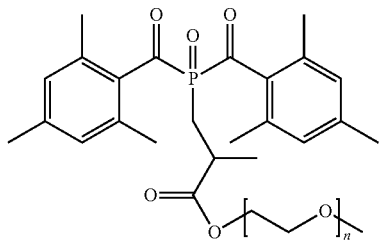

(5)

where n is an integer of 1 to 1000.

15. The solvent-free dental adhesive composition according to claim 1, wherein the compound (C-2) of formula (2) is at least one selected from the group consisting of a compound of formula (6) and a compound of formula (7)

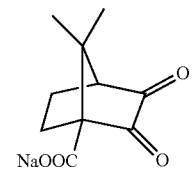

(6)

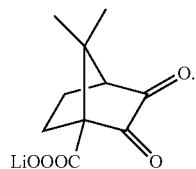

(7)

16. The solvent-free dental adhesive composition according to claim 1, wherein the compound (C-2) of formula (2) is a compound of formula (6)

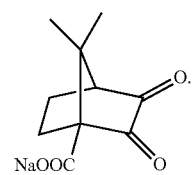

(6)

17. The solvent-free dental adhesive composition according to claim 1, wherein the compound (C-2) of formula (2) is a compound of formula (7)

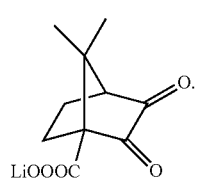

(7)

18. A dental bonding material comprising the solvent-free dental adhesive composition according to claim 1.

19. A self-adhesive dental composite resin comprising the solvent-free dental adhesive composition according to claim 1.

20. A dental cement comprising the solvent-free dental adhesive composition according to claim 1.

* * * * *